United States Patent
Orji et al.

(10) Patent No.: US 11,914,090 B2
(45) Date of Patent: Feb. 27, 2024

(54) MITIGATING RESIDUAL NOISE IN A MARINE SURVEY WITH ORTHOGONAL CODED PSEUDO-RANDOM SWEEPS

(71) Applicant: PGS Geophysical AS, Oslo (NO)

(72) Inventors: Okwudili Orji, Drammen (NO); Endrias G. Asgedom, Oslo (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 663 days.

(21) Appl. No.: 16/997,339

(22) Filed: Aug. 19, 2020

(65) Prior Publication Data
US 2021/0063597 A1 Mar. 4, 2021

Related U.S. Application Data

(60) Provisional application No. 62/892,999, filed on Aug. 28, 2019.

(51) Int. Cl.
*G01V 1/38* (2006.01)
*G01V 1/30* (2006.01)
*B63B 21/62* (2006.01)

(52) U.S. Cl.
CPC ............ *G01V 1/3843* (2013.01); *G01V 1/306* (2013.01); *G01V 1/3861* (2013.01); *B63B 21/62* (2013.01); *B63B 2211/02* (2013.01); *G01V 2210/1293* (2013.01); *G01V 2210/1423* (2013.01); *G01V 2210/3246* (2013.01); *G01V 2210/6224* (2013.01)

(58) Field of Classification Search
CPC .... G01V 1/3843; G01V 1/306; G01V 1/3861; G01V 2210/1293; G01V 2210/1423; G01V 2210/3246; G01V 2210/6224; B63B 2211/02
See application file for complete search history.

(56) References Cited

U.S. PATENT DOCUMENTS

| | | | | |
|---|---|---|---|---|
| 4,675,851 A | * | 6/1987 | Savit | G01V 1/005 367/39 |
| 6,704,245 B2 | * | 3/2004 | Becquey | G01V 1/005 367/39 |
| 2017/0371055 A1 | * | 12/2017 | Poole | G01V 1/375 |

FOREIGN PATENT DOCUMENTS

CN 105976823 A * 9/2016 ........... G10L 19/018

OTHER PUBLICATIONS

Dean, "The use of pseudorandom sweeps for vibroseis surveys", 2014 Geophysical Prospecting (Year: 2014).*

(Continued)

*Primary Examiner* — Regis J Betsch

(57) ABSTRACT

Processes and systems described herein are directed to performing marine surveys with marine vibrators that emit orthogonal coded pseudo-random sweeps. In one aspect, coded pseudo-random signals are generated based on coded pseudo-random sequences. The coded pseudo-random sequences are used to activate the marine vibrators in a body of water above a subterranean formation. The activated marine vibrators generate orthogonal coded pseudo-random sweeps. A wavefield emitted from the subterranean formation in response to the orthogonal coded pseudo-random sweeps is detected at receivers located in a body of water. Seismic signals generated by the receivers may be cross-correlated with a signature of one of the orthogonal coded pseudo-random sweeps to obtain seismic data with incoherent residual noise.

17 Claims, 26 Drawing Sheets

(56) References Cited

OTHER PUBLICATIONS

Na et al., "A variable frequency pseudorandom coded sweep control scheme for mini-SOSIE", SEG International Exposition and 86th Annual Meeting, 2016 (Year: 2016).*

* cited by examiner

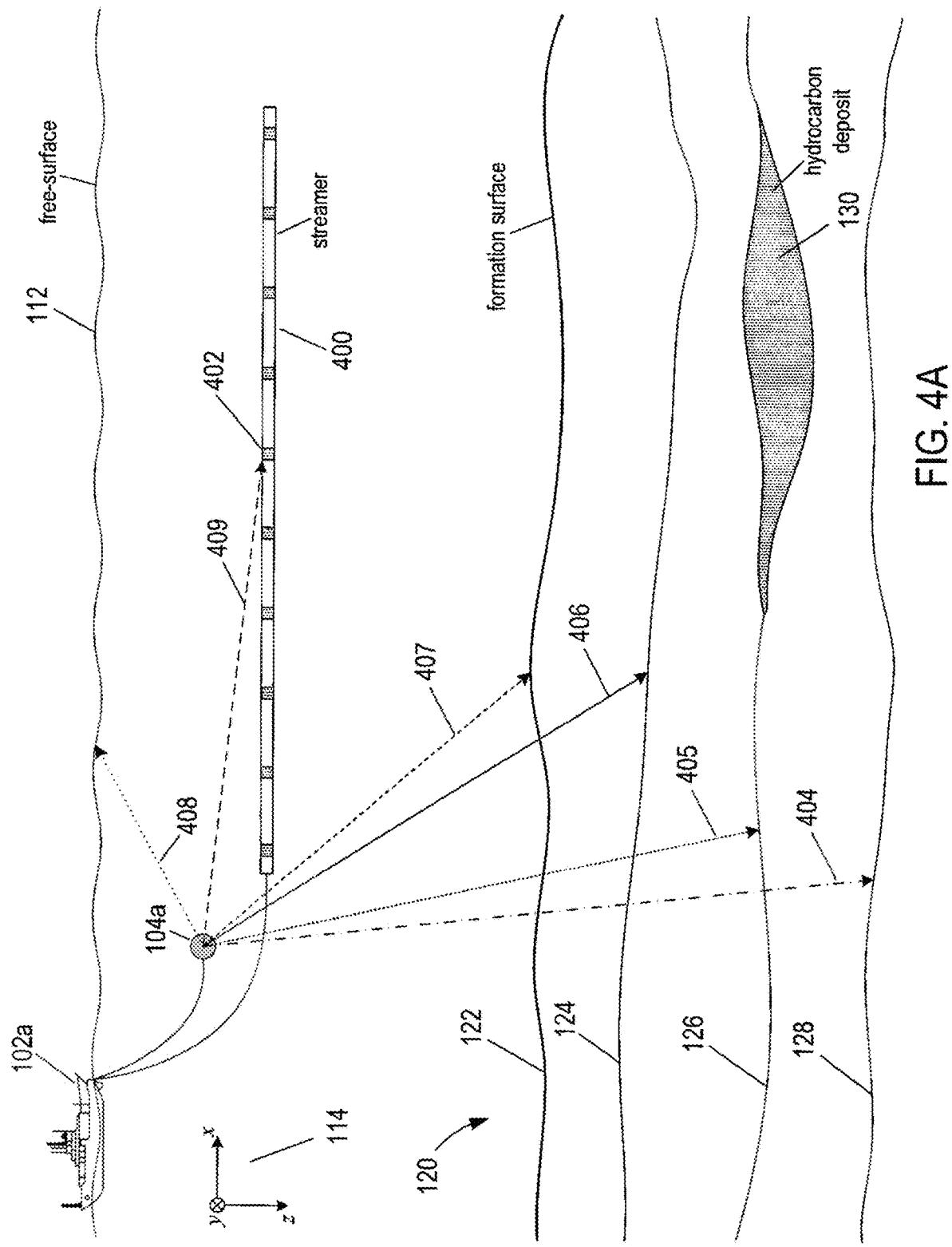

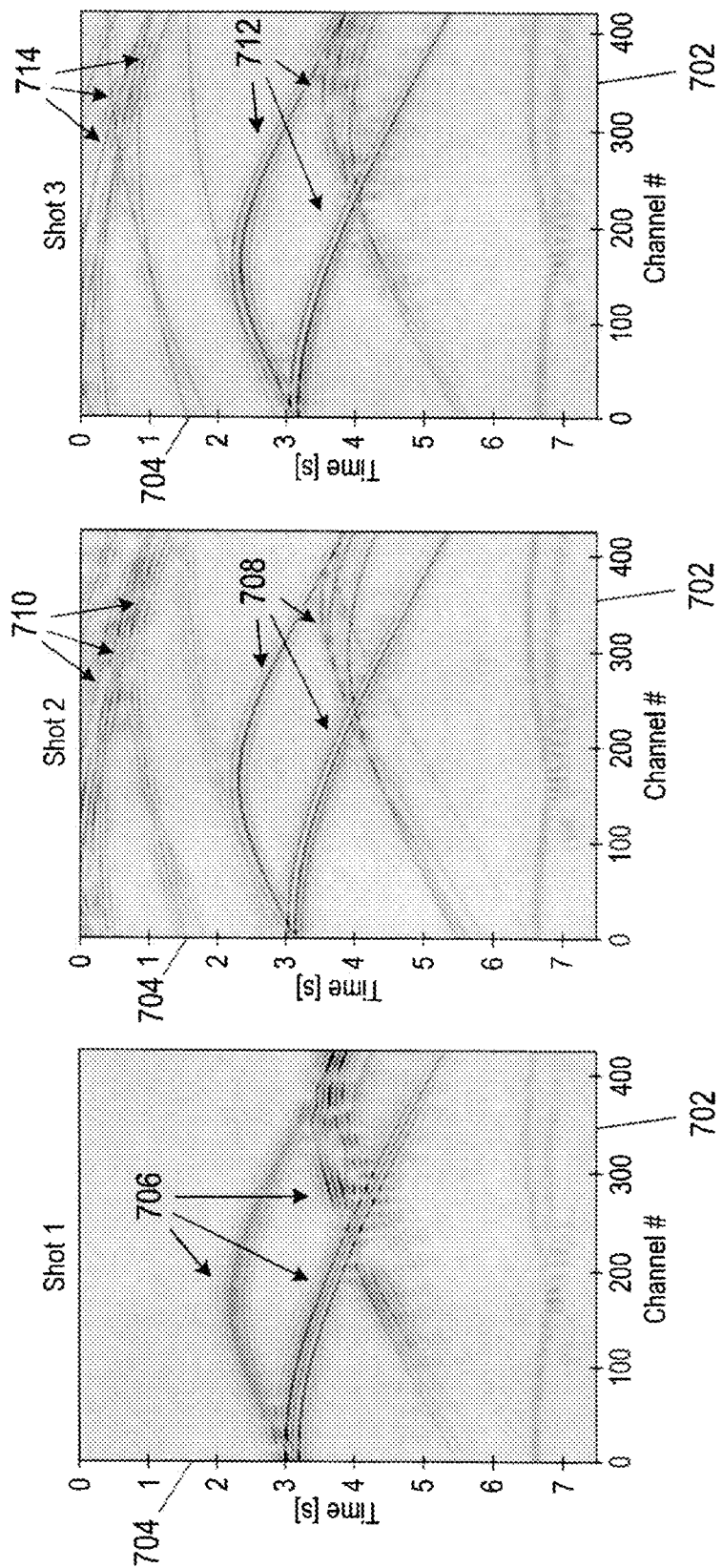

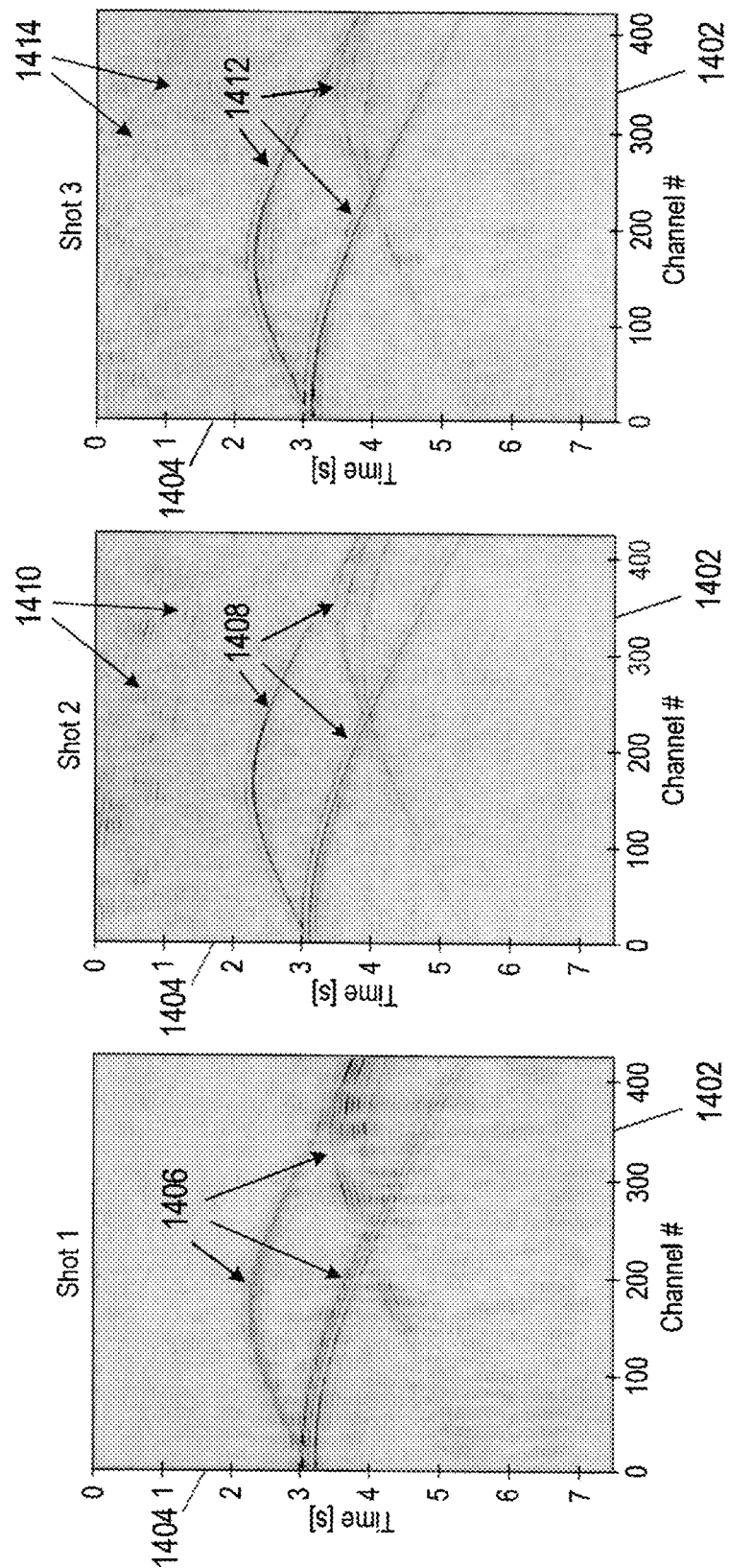

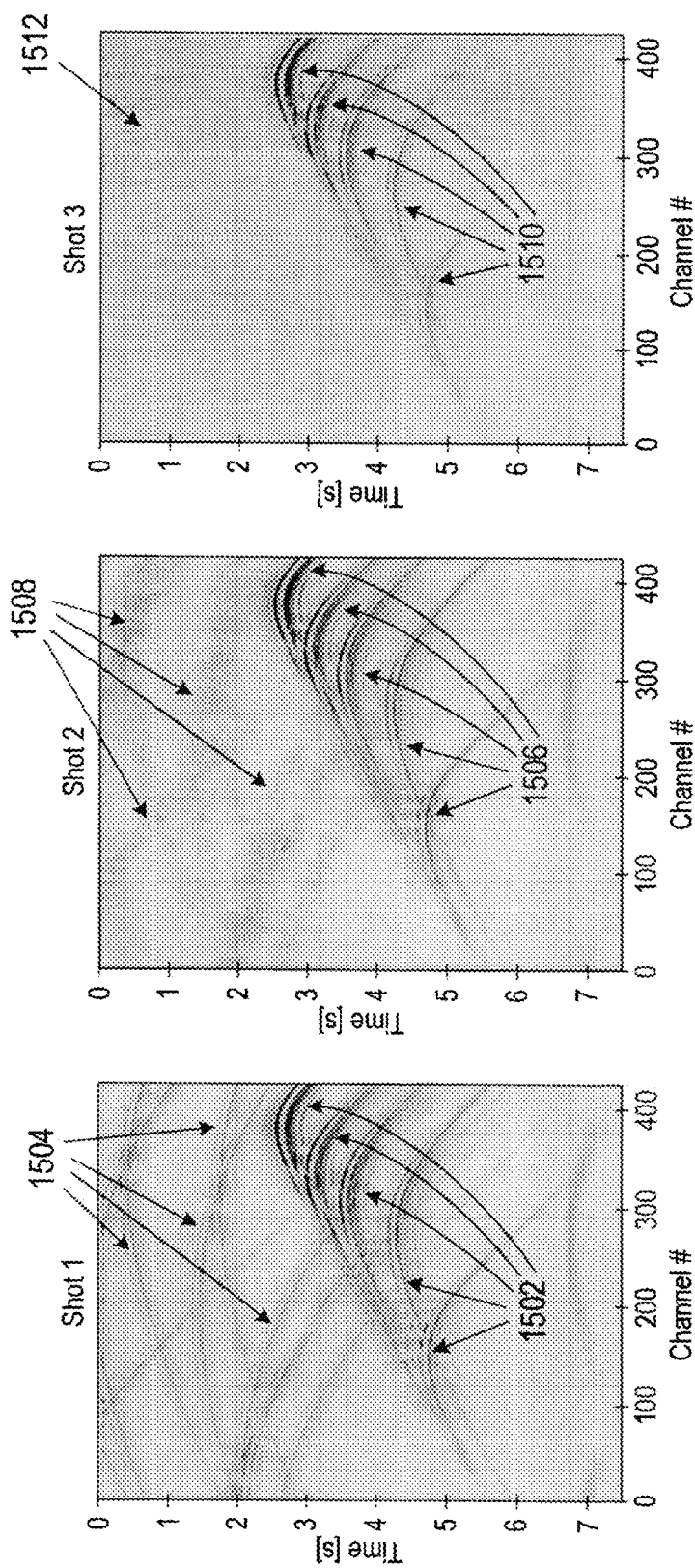

| degree ($n$) | $p(x)$ |
|---|---|
| 1 | $1 + x$ |
| 2 | $1 + x + x^2$ |
| 3 | $1 + x + x^3$ |
| 4 | $1 + x + x^4$ |
| 5 | $1 + x^2 + x^5$ |
| 6 | $1 + x + x^6$ |
| 7 | $1 + x + x^7$ |
| 8 | $1 + x + x^5 + x^6 + x^8$ |
| 9 | $1 + x^4 + x^9$ |
| 10 | $1 + x^3 + x^{10}$ |
| ⋮ | ⋮ |
| 16 | $1 + x^2 + x^3 + x^5 + x^{16}$ |
| ⋮ | ⋮ |
| 27 | $1 + x + x^7 + x^8 + x^{27}$ |
| ⋮ | ⋮ |

1702 → degree ($n$) column
1704 → $p(x)$ column

FIG. 17

MITIGATING RESIDUAL NOISE IN A MARINE SURVEY WITH ORTHOGONAL CODED PSEUDO-RANDOM SWEEPS

CROSS-REFERENCE TO RELATED APPLICATION

This application claims the benefit of Provisional Application 62/892,999, filed Aug. 28, 2019, which application is hereby incorporated by reference as if entirely set forth herein.

BACKGROUND

Marine seismology companies invest heavily in the development of marine seismic surveying equipment and seismic data processing techniques in order to obtain accurate, high-resolution images of subterranean formations located beneath a body of water. Such images may be used, for example, to determine the structure of the subterranean formations, to discover petroleum reservoirs, and to monitor petroleum reservoirs during production. A typical marine seismic survey is performed with one or more survey vessels that tow a seismic source and many streamers through the body of water. The survey vessel contains seismic acquisition equipment, such as navigation control, seismic source control, seismic receiver control, and recording equipment. A seismic source control controls activation of the one or more seismic sources at selected times or locations. A seismic source may be an impulsive source comprised of an array of air guns that are activated to produce impulses of acoustic energy. Alternatively, a seismic source may be a marine vibrator that emits acoustic energy over a longer time period. The acoustic energy generated by a seismic source spreads out in all directions. A portion of the acoustic energy travels down through the water and into a subterranean formation to propagate as sound waves within the subterranean formation. At each interface between different types of liquid, rock and sediment, a portion of the sound wave is refracted, a portion is transmitted, and another portion is reflected into the body of water to propagate as a reflected wavefield toward the water surface. The streamers are elongated spaced apart cable-like structures towed behind a survey vessel in the direction the survey vessel is traveling and are typically arranged substantially parallel to one another. Each streamer contains many seismic receivers or sensors that detect pressure and/or particle motion wavefields of the sound waves. The streamers collectively form a seismic data acquisition surface that records wavefields as seismic data in the recording equipment. The recorded pressure and/or particle motion wavefields are processed to generate images of the subterranean formation, enabling geoscientist to identify potential hydrocarbon reservoirs that may be suitable for oil and gas extraction and to monitor hydrocarbon reservoirs under production.

DESCRIPTION OF THE DRAWINGS

FIGS. 4A-4C show example ray paths of different ways acoustic energy emitted from a vibrational source reverberates between a free surface and reflectors within a subterranean formation before reaching a receiver.

FIGS. 7A-7C shows common-shot gathers of seismic data recorded following three consecutive linear sweeps.

FIGS. 14A-14C show common-shot gathers of seismic data (i.e., shot records) recorded following three consecutive coded pseudo-random sweeps.

FIG. 15A shows a common-receiver gather of seismic data recorded with linear sweeps as described above with reference to FIGS. 7A-7C.

FIG. 15B shows a common-receiver gather of seismic data recorded with linear sweeps activated with random time delays and phases between sweeps.

FIG. 15C shows a common-receiver gather of seismic data recorded with coded pseudo-random sweeps as described above with reference to FIGS. 14A-14C.

FIG. 17 shows a table of examples of primitive polynomials.

DETAILED DESCRIPTION

In recent years, interest in replacing impulsive sources in marine surveys with marine vibrators has increased. A typical impulsive source comprises air guns that when activated (i.e., shot) rapidly release compressed gasses into the surrounding water, producing a burst of acoustic energy in about 30 milliseconds (i.e., about 0.03 seconds). An impulsive source signature is characterized by a pulse with an acoustic amplitude rise time of only a few milliseconds between the ambient background noise level and the maximum acoustic amplitude. By contrast, a vibrational source may comprise a single marine vibrator or an array of marine vibrators. Each marine vibrator generates non-impulsive acoustic energy in the form of an oscillating pressure wavefield over time (e.g., on the order of about 5 seconds or longer). The oscillating pressure wavefield is called a "sweep." Vibrational sources have potential advantages over impulsive sources. For example, vibrational sources produce acoustic energy with lower sound pressure levels than impulsive sources, which may have less of an environmental impact on marine life than impulsive sources.

Seismic data recorded in a marine survey comprises a combination of signal and noise. The signal is the part of the seismic data that relates to the geological structures of a subterranean formation under investigation. The noise comprises all other components of the data. The noise may be further divided into two components: random noise and coherent noise. Random noise is statistically random and is typically created by effects that are not connected with the marine survey, such as propeller noise, swells, or vibrations created by towing a streamer through a body of water. On the other hand, coherent noise comprises components that are generated by the marine survey itself but is of no direct interest for geological interpretation. For example, a reflected wavefield that continues to reverberate long after the source wavefield was generated appears in seismic data recorded for subsequent activations of the source as coherent residual noise. Because marine vibrators generate acoustic energy over time, recorded seismic data often contains coherent residual noise contamination from previous activations of marine vibrators.

Processes and systems described herein are directed to performing marine surveys with one or more marine vibrators operated in a manner that mitigates residual noise contamination created by previous activations of the one or more marine vibrators. In particular, processes and systems operate each marine vibrator to controllably generate acoustic energy with orthogonal coded pseudo-random sweeps. As a result, any residual noise in recorded seismic data is incoherent and may be essentially removed using any one or many different noise filtering methods.

Marine Seismic Surveying Using a Vibrational Source

Figure 1A:
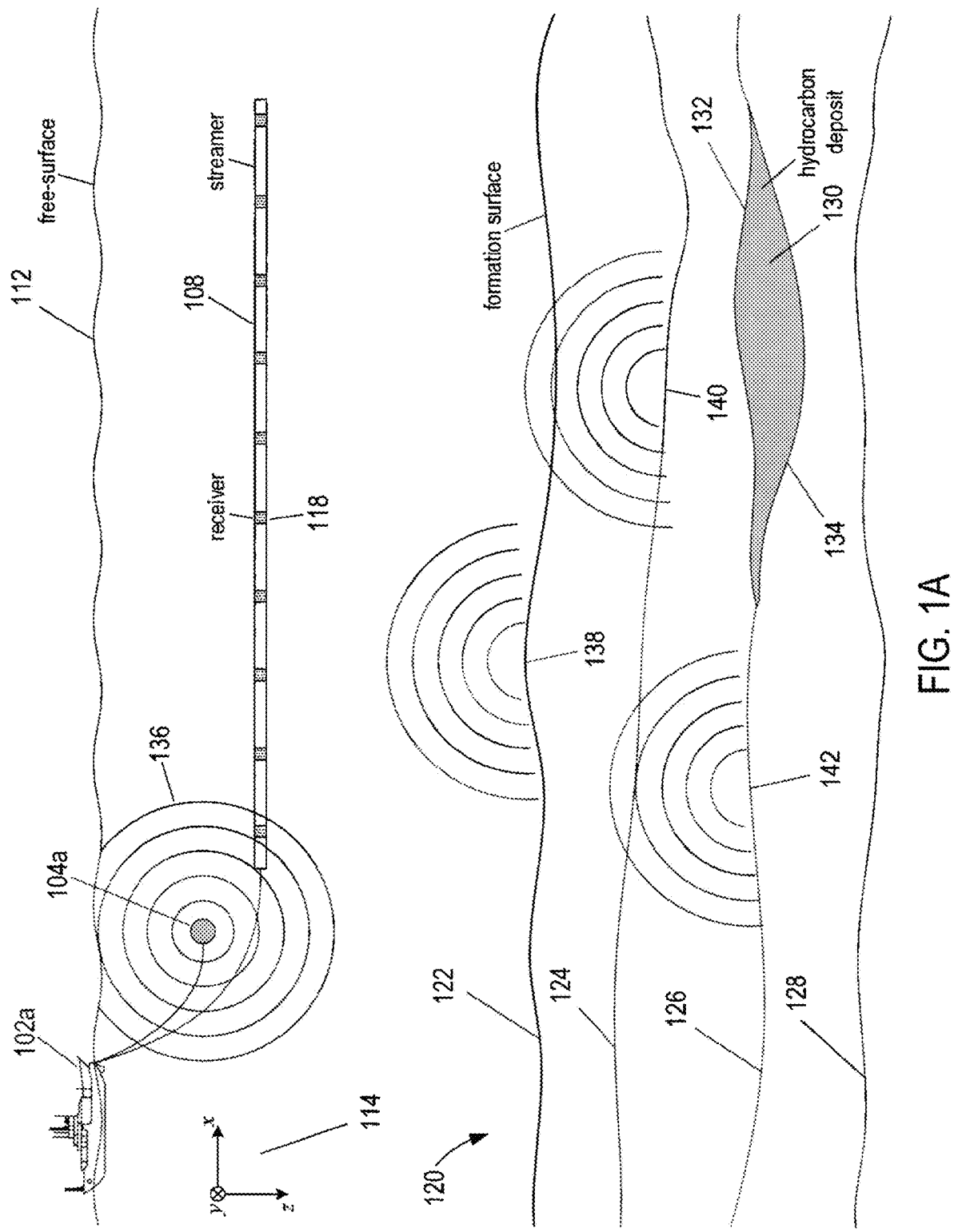
FIGS. 1A-1B show side-elevation and top views, respectively, of an example marine seismic data acquisition system.
Figure 1B:
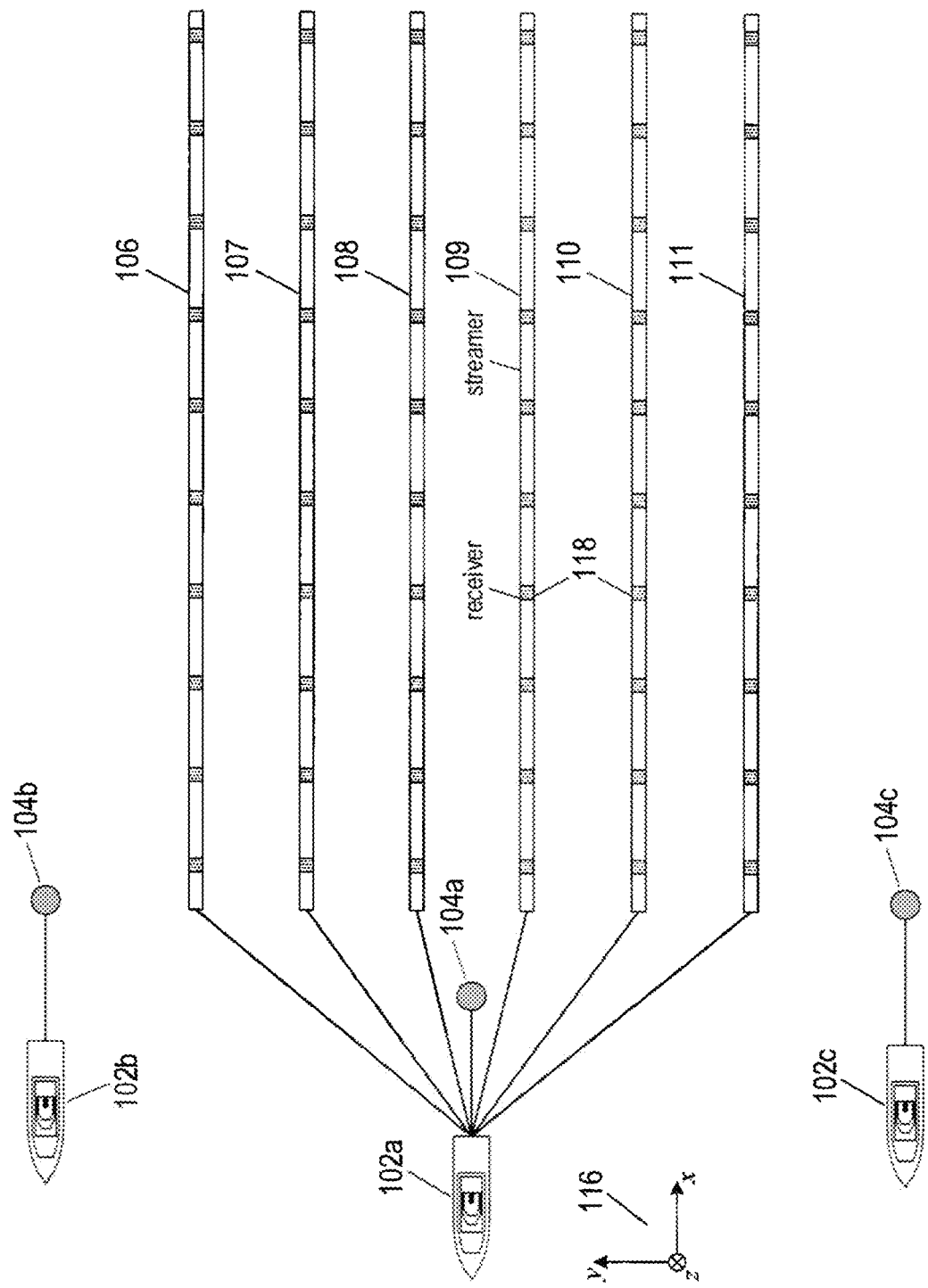

FIGS. 1A-1B show a side-elevation view and a top view, respectively, of an example marine seismic data acquisition system comprising an exploration seismology survey vessel 102a and a vibrational source 104a. A seismic data acquisition system is not limited to one source as shown in FIGS. 1A-1B. In practice, the number of sources can range from as few as a single vibrational source towed by a survey vessel to multiple vibrational sources towed by different survey vessels. The body of water can be, for example, an ocean, a sea, a lake, a river, or any portion thereof. In this example, the survey vessel 102a tows six streamers 106-111 below the free surface of a body of water. Each streamer is attached at one end to the survey vessel 102a via a streamer-data-transmission cable. A data acquisition surface is not limited to six streamers as shown in FIG. 1B. In practice, the number of streamers used to form a data acquisition surface can range from as few as one streamer to as many as 20 or more streamers. Marine surveys are not limited to using a single vibrational source. For example, FIG. 1B shows two additional survey vessels 102b and 102c towing corresponding vibrational sources 104b and 104c.

FGI. 1A includes an xz-plane 114, and FIG. 1B includes an xy-plane 116, of the same Cartesian coordinate system having three orthogonal, spatial coordinate axes labeled x, y and z. The coordinate system specifies orientations and coordinate locations within the body of water. The x-axis specifies the position of a point in a direction parallel to the length of the streamers or the direction of the survey vessel and is referred to as the "in-line" direction. The y-axis specifies the position of a point in a direction perpendicular to the x-axis and substantially parallel to the free surface 112 and is referred to as the "cross-line" direction. The z-axis, also referred to as the "depth" axis, specifies the position of a point in a direction perpendicular to the xy-plane (i.e. perpendicular to the free surface 112) with the positive z-direction pointing downward away from the free surface 112.

The streamers may be towed to form a planar horizontal seismic data acquisition surface with respect to the free surface. However, in practice, the streamers may be smoothly varying due to active sea currents and weather conditions. A seismic data acquisition surface is not limited to the parallel streamers shown in FIGS. 1A and 1B. In other implementations, the streamers may be towed with progressively larger streamer separation in the crossline direction toward longer distances from the survey vessel 102a in a process called "streamer fanning." Streamer fanning spreads the streamers farther apart with increasing distance from the survey vessel in the inline direction. Streamer fanning may improve coverage at far source/receiver offsets without compromising seismic data resolution or seismic data quality and may also increase acquisition efficiency by reducing seismic data infill. In still other implementations, the streamers may be towed with a downward slant with increasing distance from the survey vessel.

The streamers 106-111 are typically long cables containing power and data-transmission lines coupled to receivers (represented by shaded rectangles) such as receiver 118 that are spaced-apart along the length of each streamer. The data transmission lines couple receivers to seismic data acquisition equipment, computers, and data-storage devices located onboard the survey vessel 102. Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

In FIG. 1A, curve 122, the formation surface, represents a top surface of the subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102a moves over the subterranean formation 120, the vibrational source 104a produces acoustic energy over time that spreads out in all directions away from the vibrational source 104a. For the sake of simplicity, FIG. 1A shows acoustic energy expanding outward from the vibrational source 104a as a pressure wavefield 136 represented by semicircles of increasing radius centered at the vibrational source 104a. The outwardly expanding wavefronts from the vibrational source may be spherical but are shown in vertical plane cross section in FIG. 1A. The outward and downward expanding portion of the pressure wavefield 136 is called the "source wavefield" and any portion of the pressure wavefield 136 reflected downward from the free-surface 112 is called the "source ghost wavefield." The source wavefield 136 eventually reaches the formation surface 122 of the subterranean formation 120, at which point the wavefields may be partially reflected from the formation surface 122 and partially refracted downward into the subterranean formation 120, becoming elastic waves within the subterranean formation 120. In the body of water, the source wavefield primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signals generated by the vibrational source 104. As shown in FIG. 1A, waves of significant amplitude may be generally reflected from points on or close to the formation surface 122, such as point 138, and from points on or very close to interfaces in the subterranean formation 120, such as points 140 and 142.

The waves comprising the reflected wavefield may be generally reflected at different times within a range of times following the source wavefield. A point on the formation surface 122, such as the point 138, may receive a pressure disturbance from the source wavefield more quickly than a point within the subterranean formation 120, such as point 142. Similarly, a point on the formation surface 122 directly beneath the vibrational source 104a may receive the pressure disturbance sooner than a more distant-lying point on the formation surface 122. Thus, the times at which waves are reflected from various points within the subterranean formation 120 may be related to the distance, in three-dimensional space, of the points from the vibrational source 104.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflectors within the subterranean formation 120 of interest to exploration seismologists.

Figure 2:
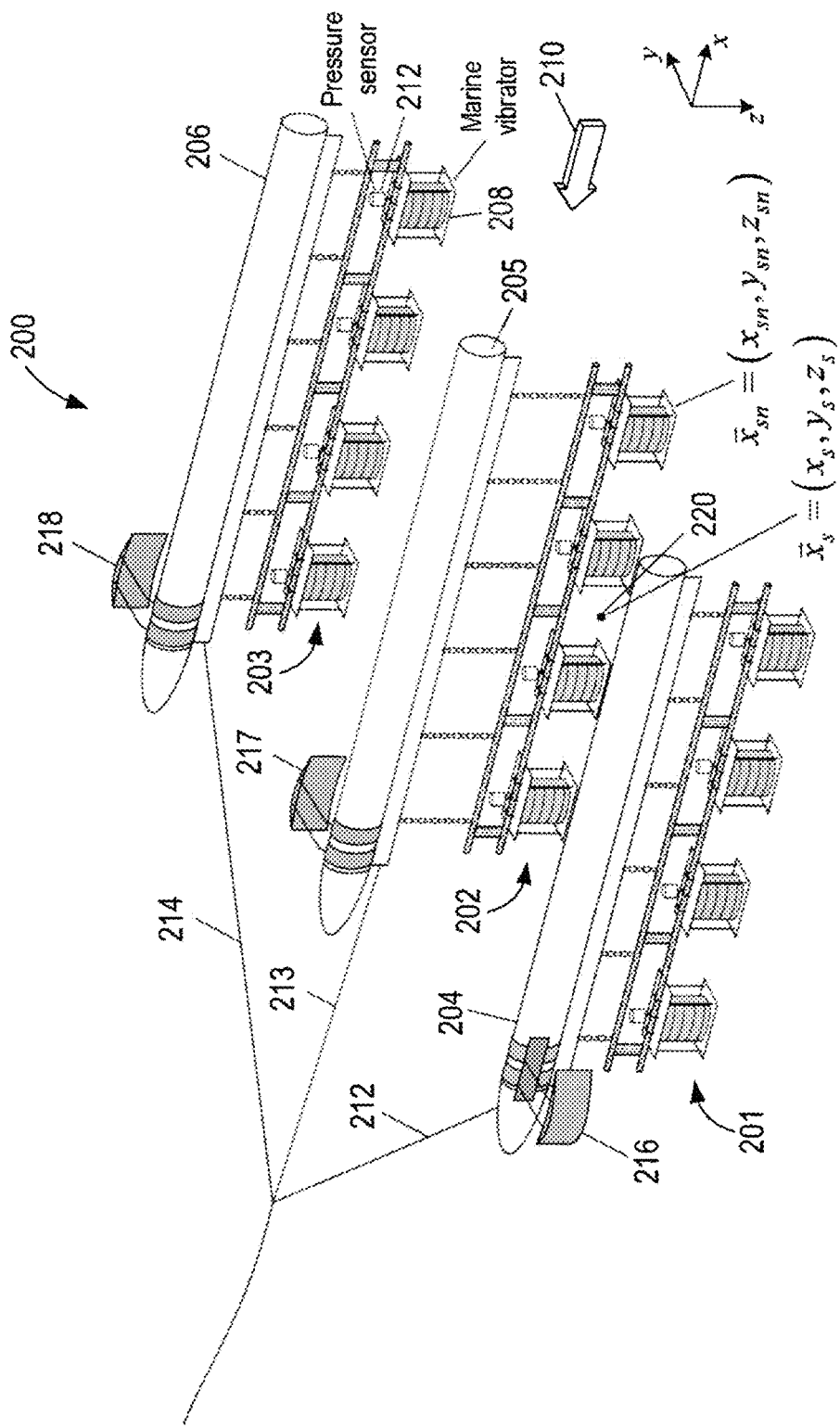
FIG. 2 shows an isometric view of an example vibrational source.

Each of the vibrational sources 104a, 104b, and 104c may be comprised of a single marine vibrator or an array of marine vibrators. FIG. 2 shows an isometric view of an example vibrational source 200 comprising an array of marine vibrators. The array of marine vibrators comprises three sub-arrays 201-203 of marine vibrators. Each marine vibrator is suspended from one of three floats 204-206. For example, sub-array 203 includes a float 206 with four marine vibrators, such as marine vibrator 208, suspended below the float 206 in the body of water. In other implementations, each sub-array also includes pressure sensors. Each marine vibrator has a corresponding pressure sensor that measures a pressure wavefield created by the corresponding marine vibrator as the source 200 moves in the direction represented by directional arrow 210. For example, pressure sensor 212 may be located approximately 1 m from corresponding marine vibrator 208. Each marine vibrator may also have a motion sensor mounted on the vibrating plates to record the vibrational signature of the marine vibrator. The sub-arrays are connected to cables 212-214 that include electrical wires that transmit electrical activation signals to each marine vibrator and transmit electrical signals generated by each pressure sensor or motion sensor back to the survey vessel. The vibrational source 200 includes steering devices 216-218 that may be used to steer and control the direction of the vibrational source 200 while being towed through the body of water. Point 220 represents the geometrical center of the marine vibrators with Cartesian coordinates denoted by $\vec{x}_s = (x_s, y_s, z_s)$. The Cartesian coordinates of each marine vibrator are denoted by $\vec{x}_{sn} = (x_{sn}, y_{sn}, z_{sn})$, where subscript "n" is a marine vibrator index. Each marine vibrator emits acoustic energy in the form of rapidly oscillating pressure wavefield that spread outward in all directions and is called a "sweep." A sweep measured by a collocated pressure sensor and is denoted by $s(t, \vec{x}_{sn})$. Note that vibrational sources are not limited to the example of twelve marine vibrators shown in FIG. 2. For example, the vibrational source 104a may have as few as one marine vibrator or as many as ten or more marine vibrators.

Figure 3:
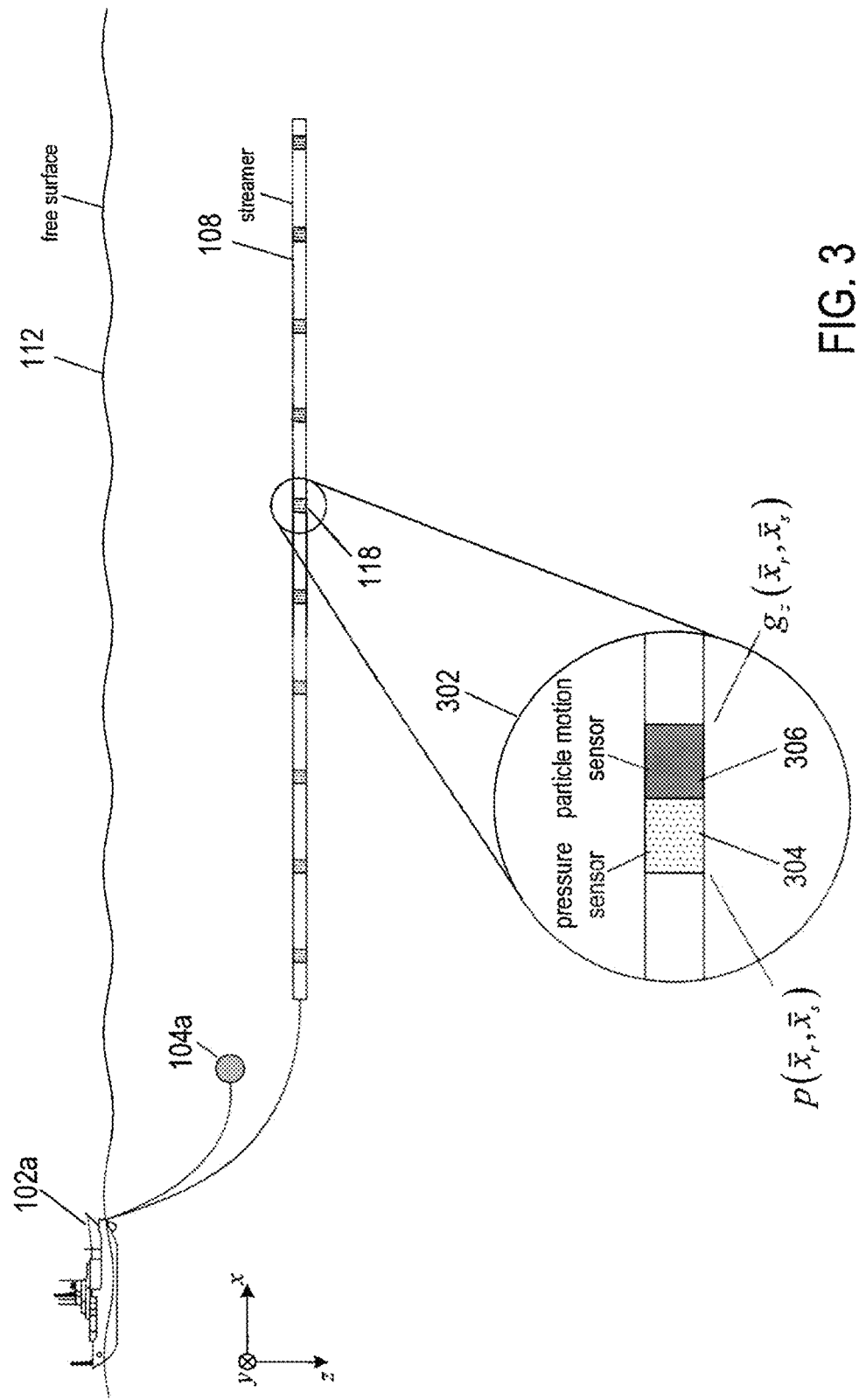
FIG. 3 shows a side-elevation view of a marine seismic data acquisition system and a magnified view of a receiver.

Each receiver 118 may be a multicomponent sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 3 shows a side-elevation view of the marine seismic data acquisition system and a magnified view 302 of the receiver 118. In this example, the magnified view 302 reveals that the receiver 118 is a multicomponent sensor comprising a pressure sensor 304 and a particle motion sensor 306. The pressure sensor may be, for example, a hydrophone. Each pressure sensor is a non-directional sensor that measures changes in a hydrostatic pressure wavefield over time to produce pressure wavefield data denoted by $p(\vec{x}_r, \vec{x}_s, t)$, where t represents time, and $\vec{x}_r$ represents the Cartesian coordinates $(x_r, y_r, z_r)$ of a receiver. The particle motion sensors are directional sensors that are responsive to water motion in a particular direction. In general, particle motion sensors detect particle motion (i.e., displacement, velocity, or acceleration) in a direction and may be responsive to such directional displacement of the particles, velocity of the particles, or acceleration of the particles. A particle motion sensor that measures particle displacement generates particle displacement data denoted by $g_{\vec{n}}(\vec{x}_r, \vec{x}_s, t)$, where the vector $\vec{n}$ represents the direction along which particle displacement is measured. A particle motion sensor that measures particle velocity (i.e., particle velocity sensor) generates particle velocity wavefield data denoted by $\vec{x}_r(\vec{x}_s, v_{\vec{n}}, t)$. A particle motion sensor that measures particle acceleration (i.e., accelerometer) generates particle acceleration data denoted by $\vec{x}_s(\vec{x}_r, a_{\vec{n}}, t)$. The data generated by one type of particle motion sensor may be converted to another type. For example, particle displacement data may be differentiated to obtain particle velocity wavefield data, and particle acceleration data may be integrated to obtain particle velocity wavefield data.

The term "particle motion data" refers to particle displacement data, particle velocity wavefield data, or particle acceleration data. The term "seismic data" refers to pressure wavefield data and/or particle motion data. Pressure wavefield data may also be called the "pressure wavefield." Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n} = (0, 0, z)$) in which case $g_z(\vec{x}_r, \vec{x}_s, t)$ is called vertical wavefield displacement data, $v_z(\vec{x}_r, \vec{x}_s, t)$ is called vertical velocity wavefield, and $a_z(\vec{x}_r, \vec{x}_s, t)$ is called vertical acceleration wavefield. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, \vec{x}_s, t)$, each receiver may include a particle motion sensor that measures the wavefield in the inline direction in order to obtain the inline velocity wavefield, $v_x(\vec{x}_r, \vec{x}_s, t)$, and a particle motion sensor that measures the wavefield in the crossline direction in order to obtain the crossline velocity wavefield, $v_y(\vec{x}_r, \vec{x}_s, t)$. In certain implementations, the receivers may be only pressure sensors, and in other implementations, the receivers may be only particle motion sensors. The three orthogonal velocity wavefields form a velocity wavefield vector $\vec{v} = (v_x, v_y, v_z)$.

The streamers 106-111 and the survey vessel 102a may include sensing electronics and data-processing facilities that allow seismic data generated by each receiver to be correlated with the time each airgun is activated, absolute positions on the free surface 112, and absolute three-dimensional positions with respect to an arbitrary three-dimensional coordinate system. The pressure wavefield and particle motion wavefield may be stored at the receiver and/or may be sent along the streamers and data transmission cables to the survey vessel 102, where the data may be stored electronically, magnetically, or optically on data-storage devices located onboard the survey vessel 102a and/or transmitted onshore to data-storage devices located in a seismic data-processing facility.

Each pressure sensor and particle motion sensor may include an analog-to-digital converter that converts time-dependent analog signals into discrete time series data that consist of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace includes a recording of a subterranean formation response to acoustic energy that passes from an activated source, into the subterranean formation where a portion of the acoustic energy is reflected and/or refracted, and ultimately detected by a sensor as described above. Each trace records variations in time-dependent amplitudes that correspond to fluctuations in acoustic energy of the wavefield measured by the sensor. In general, each trace is an ordered set of discrete spatial and time-dependent pressure or motion sensor amplitudes denoted by:

$$tr(\vec{x}_r, \vec{x}_s, t) = \{A(\vec{x}_r, \vec{x}_s, t_l)\}_{l=0}^{L-1} \quad (1)$$

where
tr represents pressure, particle displacement, particle velocity, or particle acceleration amplitude;
A represents amplitude;
$t_l$ is the l-th sample time; and
L is the number of time samples in the trace.

The coordinate location $\vec{x}_R$ of each receiver may be calculated from global position information obtained from one or more global positioning devices located along the streamers and/or the towing vessel, from depth measuring devices, such as hydrostatic pressure sensors, and the known geometry and arrangement of the streamers and receivers. The receiver and source locations varies with time and may also be denoted by $\vec{x}_r = \vec{x}_r(t) = (x_r(t), y_r(t), z_r(t))$ and $\vec{x}_s = \vec{x}_s(t) = (x_s(t), y_s(t), z_s(t))$. Each trace also includes a trace header not represented in Equation (1) that identifies the specific receiver that generated the trace, receiver and source GPS spatial coordinates, receiver depth, and may include time sample rate and the number of time samples.

Reflected wavefields from the subterranean formation typically arrive first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common receiver domain are called a common receiver gather. A common-shot gather comprises traces of seismic data with the same source coordinate but different receiver coordinates in the inline direction, such as receiver coordinates along a streamer. A common-receiver gather comprises traces of seismic data with the same receiver coordinate but different source coordinates. The portion of the acoustic signal that is reflected into the body of water from the subterranean formation and that travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 4B:
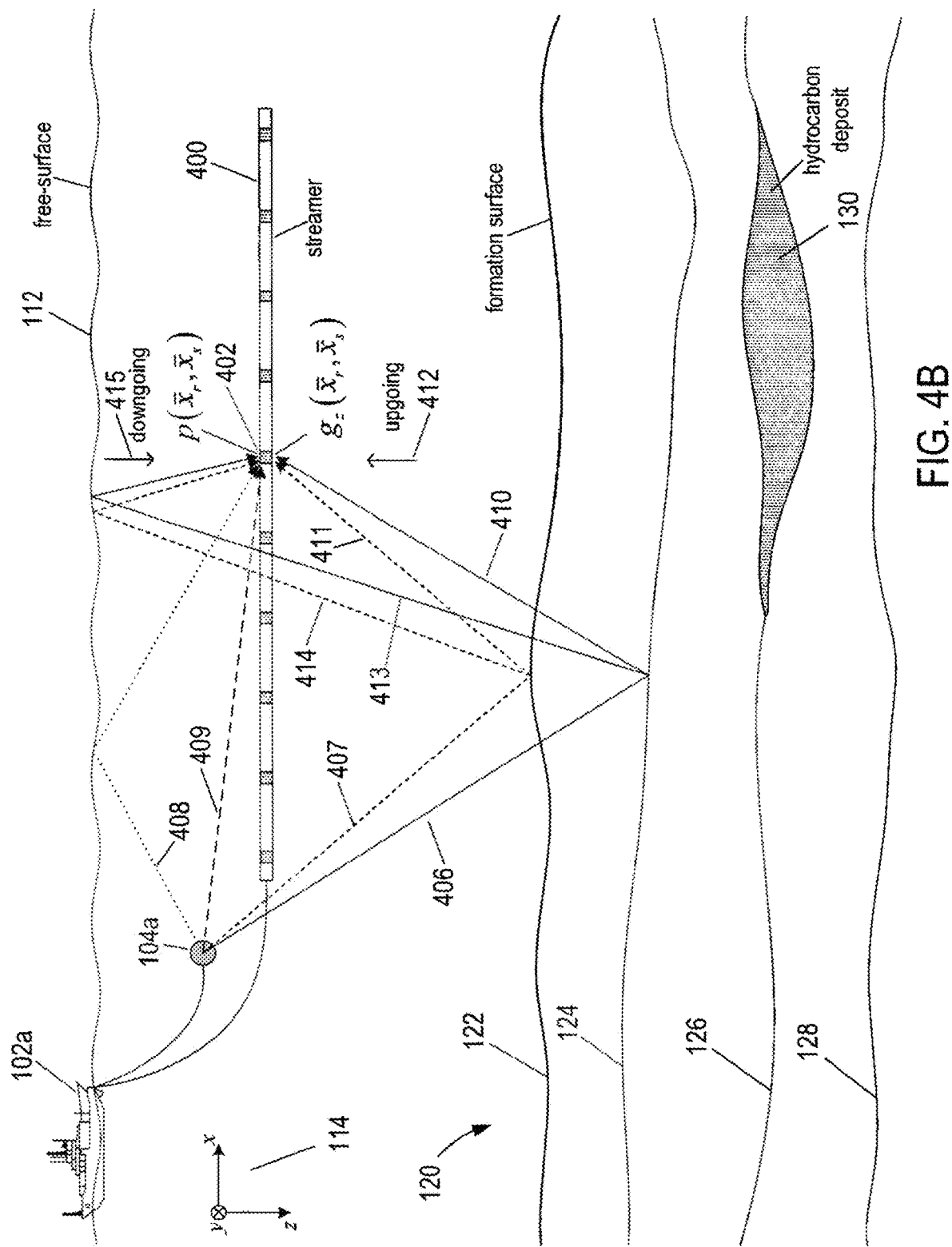
Figure 4C:
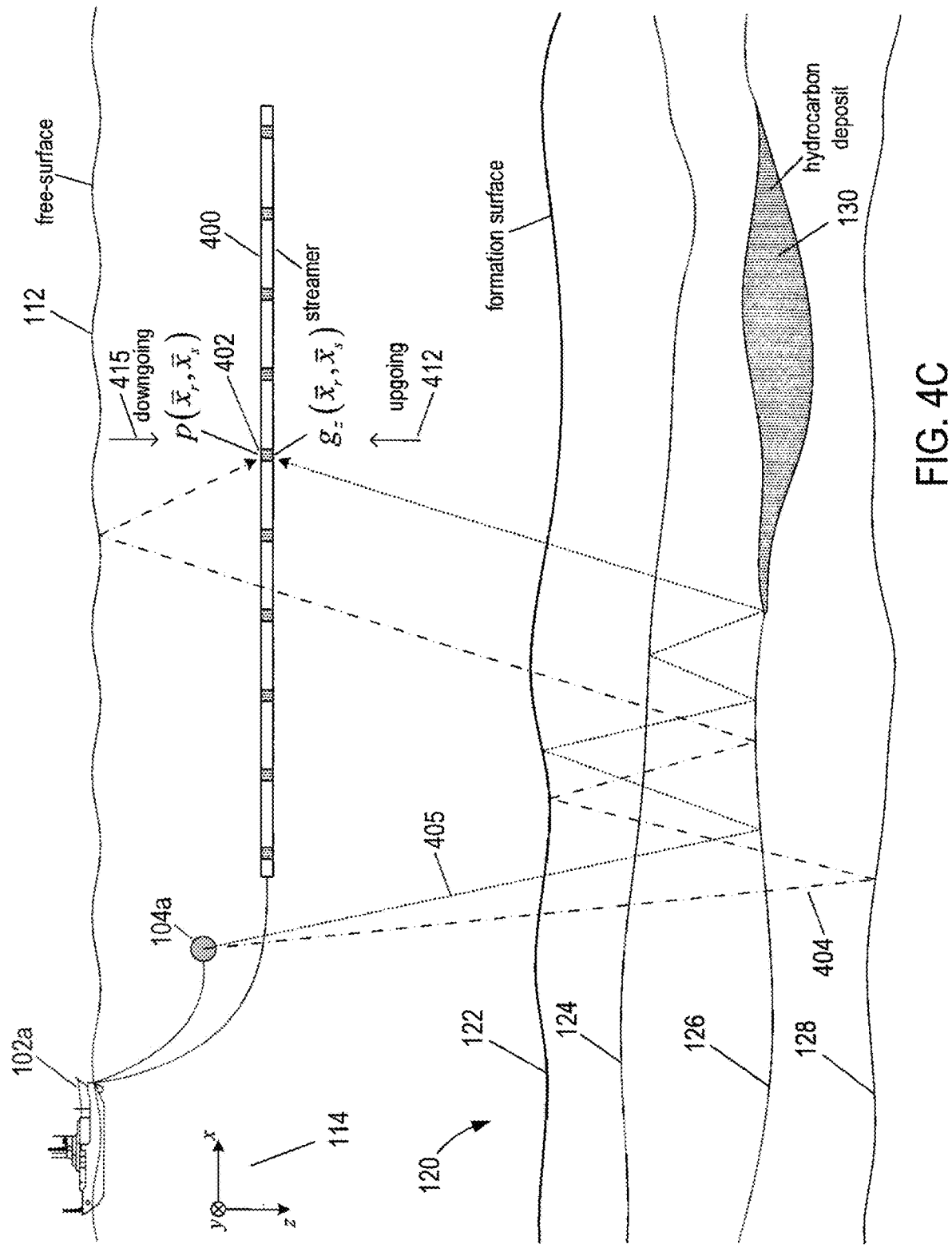

FIGS. 4A-4C show example ray paths of different ways acoustic energy emitted from the vibrational source 104a reverberates between the free surface 112 and reflectors with the subterranean formation 120 before reaching the receiver 402. For the sake of simplicity, FIGS. 4A-4C illustrate only a few of many possible ray paths acoustic energy of an acoustic signal created by the vibrational source 104a may travel before reaching the receiver 402. In FIG. 4A, directional arrows 404-409 represent ray paths of different portions of the acoustic signal generated by the vibrational source 104a. For example, ray paths 404-407 represent portions of the acoustic signal that penetrate to different interfaces of the subterranean formation 120 and ray path 408 represents a portion of the acoustic signal that reaches the free surface 112. Ray path 409 represents the source signature, which is a portion of the acoustic signal that travels directly to the receiver 402. In FIG. 4B, ray path 408 is extended to present a downward reflection from the free surface 112 (i.e., source ghost). Ray paths 410 and 411 represent reflections from the interface 124 and the formation surface 122 that travel directly to the receiver 402, which are called "upgoing primary reflections" or "primaries," as indicated by upgoing directional arrow 412. Ray paths 413 and 414 represent reflections from the interface 124 and the formation surface 122 followed by downward reflections from the free surface 112 before traveling directly to the receiver 402, which are called "downgoing reflections" as indicated by directional arrow 415. In FIG. 4C, ray paths 404 and 405 are extended to represent examples of multiple reflections between interfaces within the subterranean formation 120 and the free surface 112. Extended ray path 404 represents a downgoing free-surface multiple. Extended ray path 405 represents an upgoing multiple. In FIGS. 4B-4C, wavefields that are reflected downward from the free surface 112 before reaching the receivers, as represented by ray paths 413, 414, and 404, are examples of "downgoing wavefields" that may also be called "ghost wavefields." In FIGS. 4B-4C, wavefields that are reflected upward from the subterranean formation 120, before reaching the receivers, as represented by ray paths 410, 411, and 405, are examples of "upgoing wavefields." Seismic data may also include acoustic energy that propagated along interfaces as head waves (not shown) before being reflected upward to the surface 122 and acoustic energy that propagated into layers with velocity gradients that increase with depth due to compression, creating diving waves (not shown) that are gradually turned upward to the surface 122.

Each trace records the source signature, source ghost, primaries, and various types of free surface and subsurface multiples. For example, pressure wavefield $p(\vec{x}_r, \vec{x}_s, t)$ generated at the receiver 402 records hydrostatic pressure changes due to the source signature, source ghost, primaries, and multiples. The vertical velocity wavefield $v_z(\vec{x}_r, \vec{x}_s, t)$, also generated at the receiver 402, records the particle velocity changes due to the direct source wavefield, source ghost, primaries, and multiples. The pressure wavefield $p(\vec{x}_r, \vec{x}_s, t)$ and the vertical velocity wavefield $v_z(\vec{x}_r, \vec{x}_s, t)$ record both upgoing and downgoing pressure and vertical velocity wavefields, respectively, that reach the receiver 402.

Subterranean formations located beneath a body of water may also be surveyed using ocean bottom seismic techniques. In one implementation, these techniques may be performed with ocean bottom cables ("OBCs") laid on or near the water bottom. The OBCs are similar to towed streamers described above in that the OBCs include spaced-apart receivers, such as collocated pressure and particle motion sensors, deployed approximately every 25 to 50 meters. In other implementations, ocean bottom nodes ("OBNs") may be deployed along the formation surface. Each node may have collocated pressure and particle motion sensors. The OBCs and OBNs may be electronically connected to an anchored recording vessel that provides power, instrument command, and control of the pressure and/or vertical velocity data sent to recording equipment located on board the vessel. Traces of continuously recorded seismic data using streamers, as described above, OBCs, or OBNs may processed as described below.

Sweeps and Residual Noise

A marine vibrator receives a signal from a signal generator. The signal determines the position of the marine vibrator driver at any given instant of time, producing acoustic energy in the form of an oscillating pressure wavefield called a "sweep." The signal can be a pre-defined signal or a pre-generated signal. The amplitude, frequency and phase of oscillation of a sweep signal is determined by the amplitude, frequency and phase of oscillation of the signal input to the marine vibrator.

Figure 5:
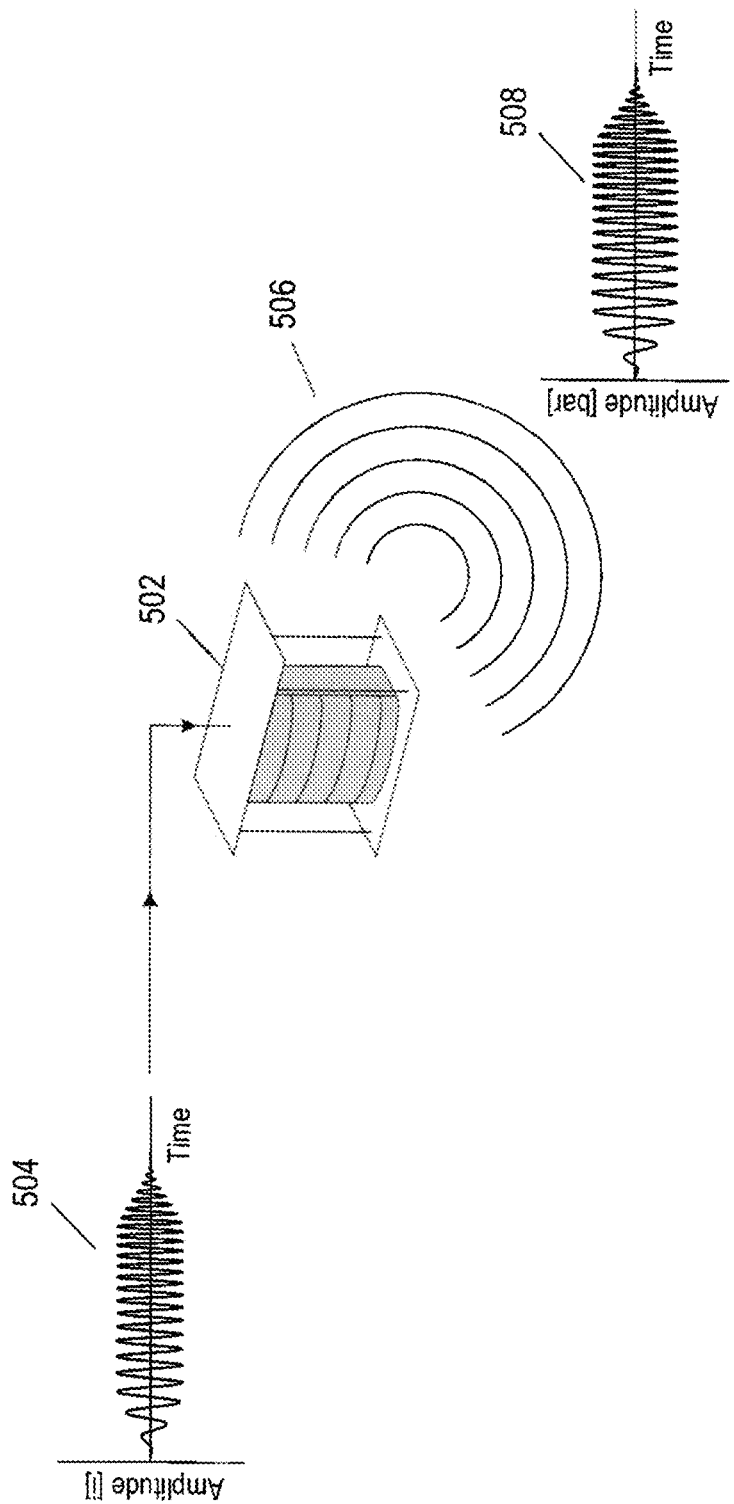
FIG. 5 shows an example signal generator that generates signals input to a marine vibrator.

FIG. 5 shows an example marine vibrator 502 driven by an input signal. Plot 504 displays a representation of a signal input to the marine vibrator 502. The signal may be a pre-defined signal or a pre-generated signal. In this example, the signal exhibits a sinusoidal amplitude with an increasing frequency of oscillation. In response to receiving the signal, the marine vibrator 502 produces a sweep 506 (i.e., oscillating pressure wavefield) with a frequency of oscillation that essentially matches that of the input signal. The generated sweep 506 may include a transfer function of the vibrator. The transfer function of the vibrator is an inherent characteristic of the vibrator system due to its design. In this application, the transfer function is taken to be 1 for simplicity. Plot 508 displays amplitude and frequency of oscillation of the sweep 508, which matches the sinusoidal amplitude and frequency of oscillation of the signal.

The amplitude, frequency, and phase of oscillation of a sweep is called the sweep signature or simply the "signature." Marine vibrators are typically operated to emit sweeps with a sinusoidal frequency of oscillation that may be mathematically modeled by the following expression:

$$s(t) = a(t)\sin[2\pi\theta(t)t] \quad (2)$$

where
a(t) represents a time-dependent amplitude of the sweep;
θ(t) represents a time-dependent frequency of the sweep; and
t is time.

In Equation (2), the marine vibrator coordinate $\vec{x}_{sn}$ is suppressed. The amplitude a(t) has units of pressure. The sinusoidal term, sin[2πθ(t)t], models oscillations in a sweep over time. The frequency θ(t) has units of inverse time and is equivalent to the actual vibrational frequency of the marine vibrator and the signal sent to the marine vibrator. The quantity 2πθ(t) is a time-dependent angular frequency with units of radians per unit of time. A sweep is generated over a time period called a sweep interval. The frequency of a sweep may be mathematically modeled by the following expression:

$$\theta(t) = f_0 + \left(\frac{df}{dt}\right)t \quad (3)$$

where
$f_0$ is an initial frequency of the sweep emitted from a marine vibrator at the start of a sweep; and
df/dt is the rate at which the frequency of the sweep changes over time.

A marine vibrator may be operated to generate a linear sweep with a frequency that continuously increases (i.e., an upsweep with θ(t)>0) or continuously decreases (i.e., a downsweep with θ(t)<0) for the duration of the sweep. A sweep begins with the initial frequency $f_0$ at the start of the sweep and stops with a final frequency denoted by $f_1$ (i.e., $f_1=f_0+(df/dt)T$). Marine vibrators often emit linear sweeps (i.e., df/dt is constant) with frequencies that linearly increase (or decrease) for the duration of the sweep. Marine vibrators may also be operated to generate each sweep with a particular phase. A parameter, φ, represents a phase angle with units of radians, where −π<φ≤π. The signature of a sweep generated with a phase shift may be mathematically modeled as follows:

$$s(t)=a(t)\sin[2\pi\theta(t)t\pm\varphi] \quad (4)$$

The phase φ shifts angular dependence of the sweep. A positive valued phase, +φ, shifts the angle of the signature forward in the angle domain. A negative valued phase, −φ, shifts the angle of the signature backward in the angle domain.

Sweeps are often generated by activating a marine vibrator in sweep intervals of about 5 to about 7 seconds or longer. Seismic data is recorded in shot records that typically begins at the start of a sweep and continues for a period of time after the sweep has stopped. For example, a marine vibrator may generate a sweep for 5 seconds followed by an extra recording time of 2.5 seconds. Since recording began at the start of the sweep, the total recording length is 7.5 seconds. If the survey vessel is moving at a speed of 2.5 meters/second, the seismic data recording interval is 18.75 meters. Ideally, a shot record records only the reflected wavefield created by the sweep. However, a reflected wavefield created by a sweep typically reverberates long after the reflected wavefield was generated by the sweep and is recorded in one or more subsequent shot records as coherent residual noise. Coherent residual noise has been observed in seismic data recorded in typical recording periods of about 10 to about 12 seconds.

Figure 6:
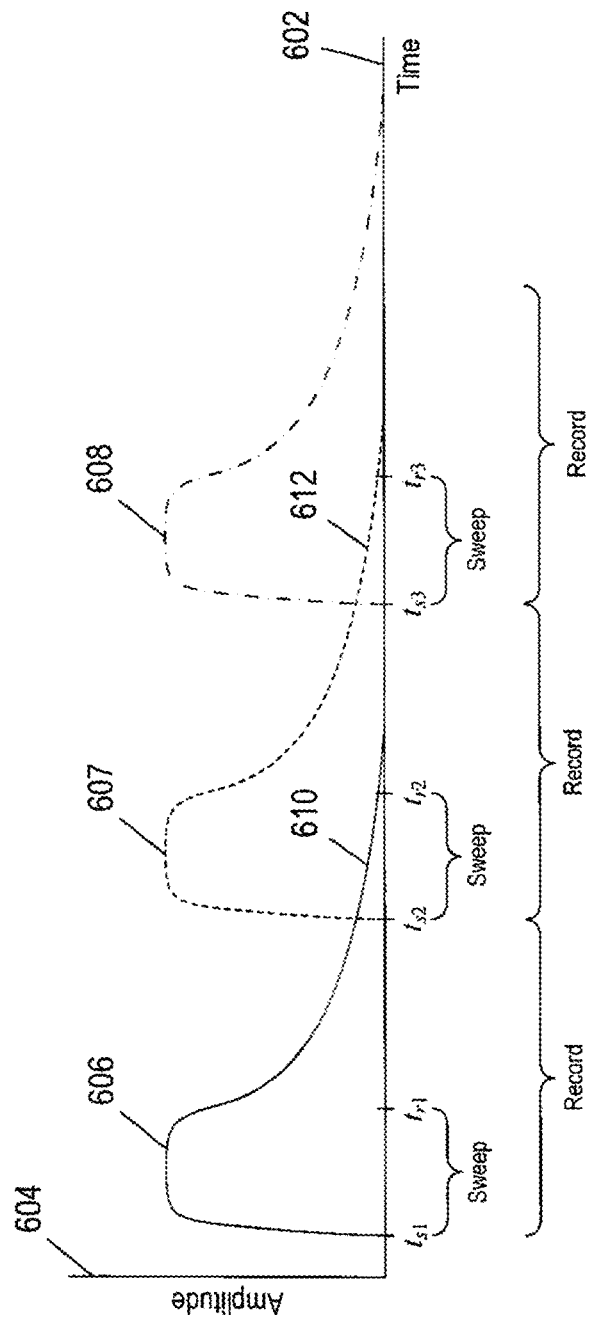
FIG. 6 shows an example plot of amplitudes of acoustic energy created by three consecutive marine vibrator activations.

FIG. 6 shows an example plot of amplitudes of acoustic energy created by three consecutive marine vibrator activations in accordance with a traditional marine survey. Horizontal axis 602 represents time. Vertical axis 604 represents a range of acoustic energy amplitude. Times $t_{s1}$, $t_{s2}$, and $t_{s3}$ along time axis 602 denote start times of sweep intervals and start times for recording seismic data in shot records. Times $t_{r1}$, $t_{r2}$, and $t_{r3}$ along time axis 602 denote end times of the sweep intervals. For example, a shot record is recorded in a recording period that begins when a marine vibrator starts generating a sweep, $t_{s1}$, and ends at the start of a subsequent sweep, $t_{s2}$. Patterned curves 606-608 represent acoustic energies created by three consecutive sweeps. Each of the curves exponentially decreases with time, representing decay of the acoustic energy of the corresponding reflected wavefields with time. However, tail ends of the curves 606-608 represent residual acoustic energy that is present as residual noise recorded in the shot records. For example, tails 610 and 612 represent residual acoustic energy that is recorded as coherent residual noise in shot records that begin at times $t_{s2}$ and $t_{s3}$, respectively.

For linear sweeps, acoustic energy created by a previous activation of a marine vibrator appears as coherent residual noise in a subsequently recorded shot record. FIGS. 7A-7C shows common-shot gathers of seismic data (i.e., shot records) recorded following three consecutive five second linear sweeps. Horizontal axis 702 represents channel numbers of receivers in the inline direction. Vertical axis 704 represents a recording period that starts at time zero. Each shot record is recorded for one of the three sweeps. FIG. 7A shows recorded reflection events of a reflected wavefield 706 after cross-correlation of the recorded seismic data with the signature of a first sweep. FIG. 713 shows reflection events of a reflected wavefield 708 after cross-correlation of the recorded seismic data with the signature of a second sweep. However, FIG. 7B shows coherent residual noise 710, which is the acoustic energy of the reflected wavefield created by the first sweep. Note that the coherent residual noise 710 is coherent because the waveform of the reflected wavefield created by the first sweep is exhibited by clearly delineated reflection events near the top of the gather in FIG. 7B. The coherent residual noise 710 is present post cross-correlation with the second sweep because the second sweep is correlated with the first sweep. FIG. 7C shows a reflected wavefield 712 after cross-correlation of the recorded seismic data with the signature of a third sweep. FIG. 7C also shows coherent residual noise 714, which is the acoustic energy of the reflected wavefield created by the second sweep. Note that the coherent residual noise 714 is exhibited by the clearly delineated reflection events near the top of the gather. The coherent residual noise 714 is present post cross-correlation with the third sweep because the second sweep is correlated with the third sweep. FIGS. 7B and 7C shows coherent residual events because the residual events correlate with the previous linear sweeps. The coherent residual noise 710 and 714 cannot be attenuated or mitigated using convention noise filtering methods, and if left in the gathers, contaminate the resulting images of the subterranean formation.

Coherent residual noise contaminates shot records and lowers the resolution of seismic images generated from the shot records. Unlike random noise, which can typically be removed using any one or many different noise filtering methods, coherent residual noise cannot be attenuated or removed using typical noise filtering methods. Coherent residual noise typically results from linear sweeps because linear sweeps are inherently correlated regardless of initial phase differences.

Figure 8A:
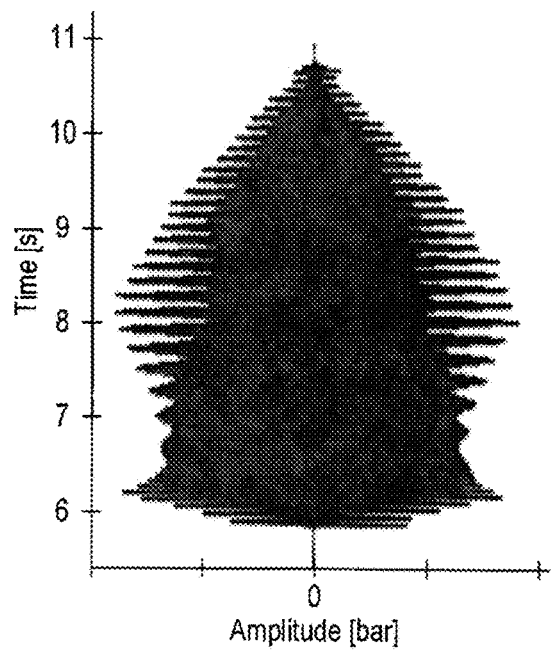
FIGS. 8A-8B show example signatures of two linear sweeps generated with different initial phases.
Figure 8B:
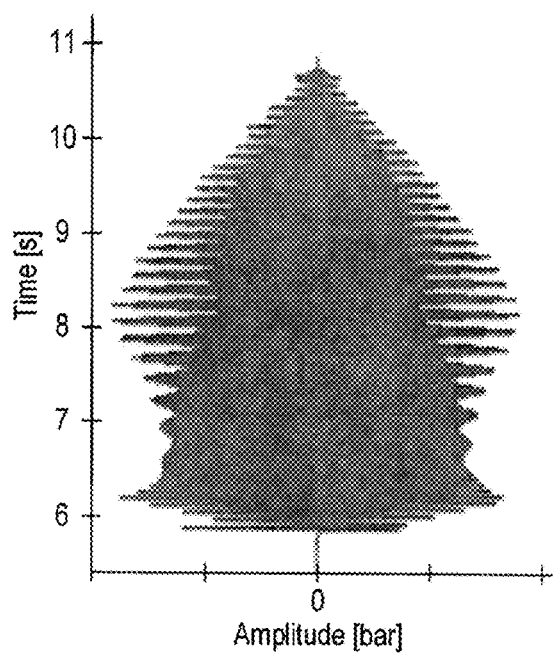

FIGS. 8A-8B show example signatures of two linear sweeps generated with different initial phases. FIG. 8A shows a signature of a first linear sweep generated with an initial phase of zero degrees. FIG. 8B shows a signature of a second linear sweep generated with an initial phase of 90 degrees with respect to the initial phase of the first linear sweep. In other words, the oscillating pressure wavefields of the first and second sweeps are 90 degrees out of phase with respect to one another.

Cross-correlating two signatures of two different sweeps is a way of measuring the degree of similarity between the two sweeps. Cross-correlation involves cross-multiplication of the individual signal elements and summation of the cross-multiplication products over a common time interval of the signals. The cross-correlation function progressively shifts one waveform past the other and for each time shift (i.e., lag) summing the cross-multiplication products to derive the cross-correlation as a function of lag and is given by:

$$R_{ij}(\tau) = \sum_{\tau=-m}^{m} s_i(t) s_j(t+\tau) \quad (5)$$

where
$s_i(t)$ is a signature of an i-th sweep;
$s_j(t)$ is a signature of a j-th sweep; and
$\tau$ is a time lag.

The cross-correlation is computed for a time lag between $-m < \tau < m$, where m is the maximum lag value. For example, lag value m may be equal to or greater than the duration of a sweep interval.

Cross-correlation of two identical signatures (i.e., $R_{ii}(\tau)$) is called autocorrelation in which all the cross-multiplication products will sum at zero lag to give a maximum positive value (i.e., a spike or peak). When two sweeps are displaced in time, the cross-multiplication products tend to cancel out to give small values. The autocorrelation peaks at zero lag and reduces to small values at larger lags. Two non-identical, but similar, signatures will likewise produce a cross-correlation that tends to cancel out to give small values for non-zero lag and is strongly peaked as zero lag. On the other hand, if two dissimilar signatures are cross-correlated the sum of the cross-multiplication products will be approximately zero for all lags due to the tendency for positive and negative products to cancel out for all lags.

Figure 9A:
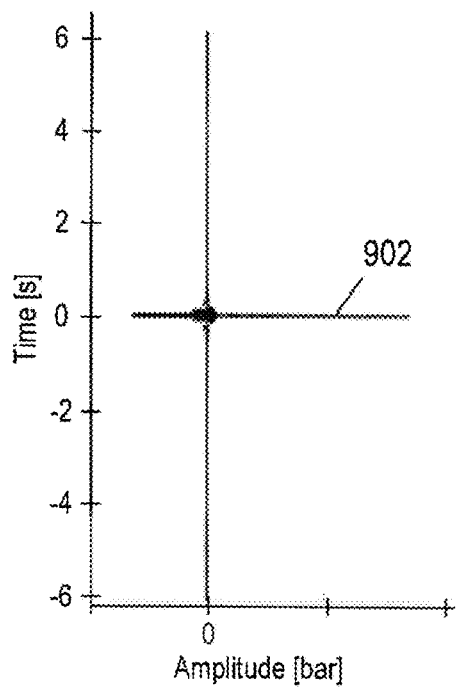
FIG. 9A shows a plot of autocorrelation of the linear sweep shown in FIG. 8A.
Figure 9B:
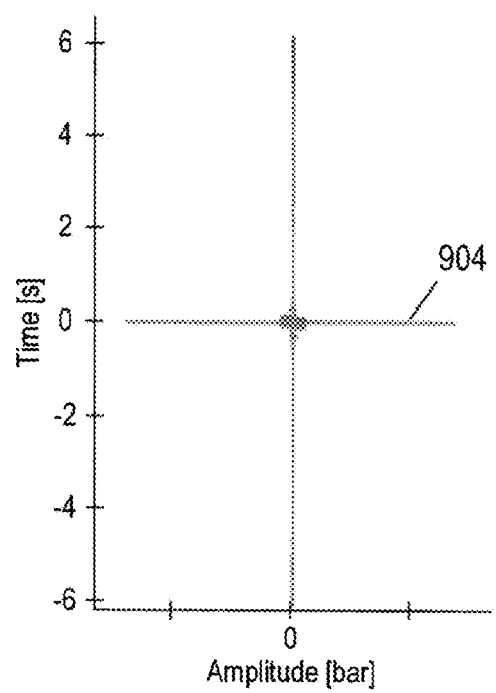
FIG. 9B shows a plot of cross-correlation of the linear sweeps shown in FIGS. 8A and 8B.

FIG. 9A shows a plot of autocorrelation of the linear sweep shown in FIG. 8A. Autocorrelation of the signature gives a sharp spike 902 at time zero (i.e., zero lag), which is expected. Autocorrelation of the signature shown in FIG. 8B (not shown) also gives a sharp spike at time zero. FIG. 9B shows a plot of cross-correlation of the linear sweeps shown in FIGS. 8A and 8B. Even though the signature shown in FIG. 8B is 90 degrees out of phase with the signature shown in FIG. 8A, the cross-correlation reveals a large spike 904 at zero lag. In other words, the linear sweeps associated with signatures shown in FIGS. 8A and 8B are correlated.

A spike in the cross-correlation of signatures of linear sweeps corresponds to coherent residual noise recorded in the shot records shown in FIGS. 7B and 7C. Even though two linear sweeps may be emitted with different (i.e., random) phases the sweeps are correlated, resulting in coherent residual noise recorded in consecutive shot records.

By contrast, for two sweeps containing only random noise, the cross-correlation of the corresponding signatures are essentially zero for all time lags. In other words, two sweeps containing random noise result in incoherent residual noise recorded in consecutive shot records.

Generating Orthogonal Coded Pseudo-Random Sweeps

Marine vibrators may be operated as described below to generate orthogonal coded pseudo-random sweeps that mitigate coherent residual noise (i.e., generate incoherent residual noise) in recorded seismic data. Each coded pseudo-random sweep is generated with characteristics of random noise and is orthogonal to other coded pseudo-random sweeps. Two coded pseudo-random sweeps are orthogonal if cross-correlation of the signatures of the two coded pseudo-random sweeps satisfies the cross-correlation condition $|R_{ij}(\tau)| < \epsilon$, where $\epsilon$ is a small number much less than one (e.g., $\epsilon$ may be equal to 0.01, 0.05, 0.1, or 0.2). Because a coded pseudo-random sweep is orthogonal to previously generated coded pseudo-random sweeps, residual noise contamination of seismic data recorded with the coded pseudo-random sweep is incoherent after cross-correlation with the signature of the coded pseudo-random sweep and may be essentially removed using any one of various noise filtering methods. In the following discussion, two coded pseudo-random sweeps are called "orthogonal coded pseudo-random sweeps" if the corresponding signatures satisfy the cross-correlation condition. Marine vibrators may be activated as described below to contemporaneously, or simultaneously, generate orthogonal coded pseudo-random sweeps in order to increase acoustic illumination of a subterranean formation.

A seismic source control located onboard the survey vessel may drive marine vibrators to generate coded pseudo-random sweeps by sending a different coded pseudo-random signal to each marine vibrator. Each coded pseudo-random signal is a modulated signal that encodes a different coded pseudo-random sequence. Coded pseudo-random sequences may be efficiently generated using a linear feedback shift register ("LFSR") with n memory cells as described below with reference to FIGS. 17-20. A coded pseudo-random sequence is denoted by $b^i$ and comprises binary digits denoted by $b_k^i$, where $b_k^i \in \{0,1\}$. A coded pseudo-random sequence with N binary digits is a maximum length sequence ("MLS") if the binary sequence satisfies the following three MLS criteria:

1) A binary sequence of length $N=2^n-1$ contains $2^{n-1}$ ones and $2^{n-1}-1$ zeros.

2) One half of runs (i.e., a subsequence of consecutive ones or consecutive zeros) are length 1; one quarter of runs are length 2; one eighth of runs are length 3; one sixteenth of runs are length 4 and so on.

3) Autocorrelation of the binary sequence is periodic:

$$r_{ii}(\tau) = \frac{1}{2N-1} \sum_{k=0}^{N-1} b_k^i b_{k+\tau}^i = \begin{cases} 1 & \text{for } \tau = 0, N, 2N, \ldots \\ -\frac{1}{N} & \text{otherwise} \end{cases} \quad (6)$$

A set of MLSs may be used as the coded pseudo-random sequences that are, in turn, used to generate coded pseudo-random signals input to marine vibrators. The coded pseudo-random sweeps generated by the marine vibrators are orthogonal coded pseudo-random sweeps.

In an alternative implementation, a set of binary sequences may be generated by randomly stringing together binary digits using a random number generator. Any binary sequence of the set of binary sequences that satisfies the three MLS criteria above is an MLS that may be used to generate a coded pseudo-random signal.

In other implementations, any two MLSs $b^i$ and $b^j$ that satisfy the following cross-correlation condition may be used to generate Gold sequences:

$$r_{ij}(\tau) = \frac{1}{2N-1}\sum_{k=0}^{N-1} b_k^i b_{k+\tau}^j < 2^{(n+1)/2} \quad (7)$$

for any lag $\tau$. The two MLS $b^i$ and $b^j$ that satisfy the condition in Equation (7) are Gold sequences. The two MLS sequences $b^i$ and $b^j$ may be used to construct a Gold sequence $b^i \oplus b^j$, where $\oplus$ is the exclusive OR operation applied to each pair of corresponding elements of $b^i$ and $b^j$ (i.e., $b_k^i + b_k^j \pmod 2$). For example, $(0,1,1,0,1) \oplus (1,0,1,1,1) = (1,1,0,1,0)$. Additional Gold sequences may be constructed from the MLS sequences $b^i$ and $b^j$ by applying a circular shift operator as follows:

$$b^i \oplus S^k \cdot b^j \quad (8)$$

where S denotes a circular shift operator.
The circular shift operator S applied to the MLS $b^j$ is represented in matrix notation by $$S^k \cdot b^j = \underbrace{SS \ldots S}_{k \text{ times}} b^{jT} \quad (9)$$

where
superscript T denotes matrix transpose; and
S is a forward circular shift operator matrix given by the following N×N matrix:

$$S = \begin{bmatrix} 0 & 1 & & & & \\ & 0 & 1 & & & \\ & & 0 & \ddots & & \\ & & & \ddots & 1 & \\ & & & & 0 & 1 \\ 1 & & & & & 0 \end{bmatrix}$$

Alternatively, the circular shift operator may be a reverse circular shift operator given by the following N×N matrix:

$$S = \begin{bmatrix} 0 & & & & & 1 \\ 1 & 0 & & & & \\ & 1 & 0 & & & \\ & & \ddots & \ddots & & \\ & & & 1 & 0 & \\ & & & & 1 & 0 \end{bmatrix}$$

The resulting set of Gold sequences is given by $$G(b^i, b^j) = \{b^i, b^j, b^i \oplus b^j, b^i \oplus S \cdot b^j, \ldots, \\ b^i \oplus S^k \cdot b^j, \ldots, b^i \oplus S^N \cdot b^j\} \quad (10)$$

Any subset of the set of Gold sequences $G(b^i, b^j)$ may be used as coded pseudo-random sequences to generate coded pseudo-random signals, which are, in turn, used to generate coded pseudo-random sweeps. The emitted coded pseudo-random sweeps are orthogonal coded pseudo-random sweeps.

Figure 10:
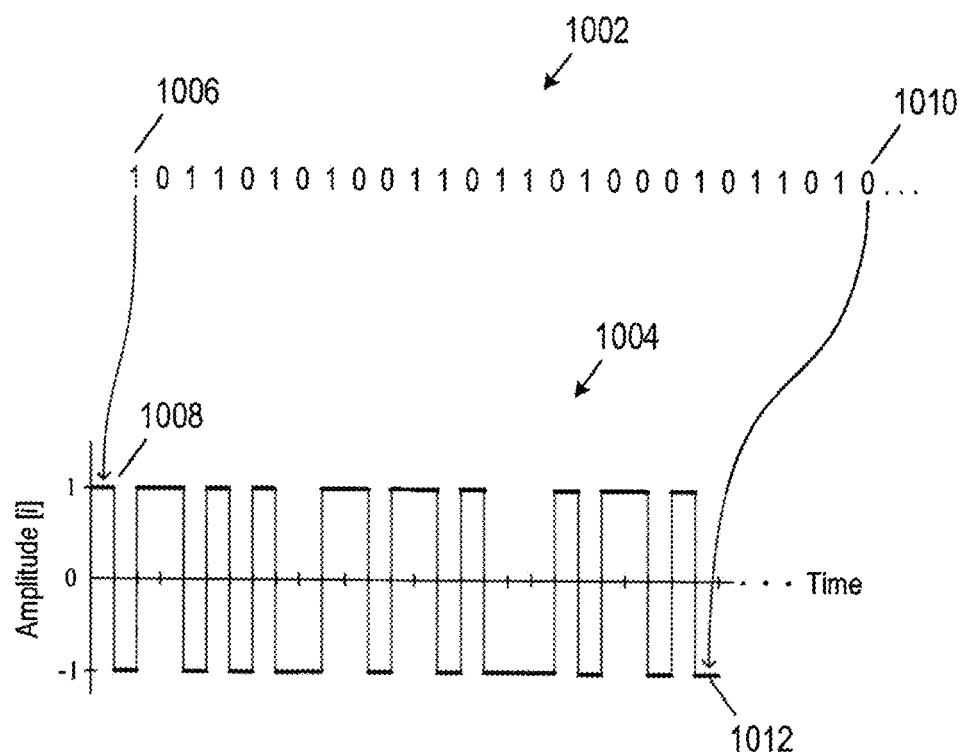
FIG. 10 shows an example of a coded pseudo-random sequence and a corresponding coded pseudo-random signal.

FIG. 10 shows an example of a coded pseudo-random sequence 1002 and a corresponding coded pseudo-random signal 1004 generated by a time-signal generator. The coded pseudo-random sequence 1002 comprises a sequence of binary digits. The coded pseudo-random sequence 1002 may be an MLS or a Gold sequence. The time-signal generator uses the coded pseudo-random sequence 1002 to encode chips of the coded pseudo-random signal 1004. Each chip is a rectangular pulse, or notch, of the coded pseudo-random signal 1004 and has an associated amplitude that corresponds to a single binary digit of the coded pseudo-random sequence 1002. For example, a binary digit "1" 1006 is encoded in the coded pseudo-random signal 1004 as a rectangular pulse of amplitude +1 1008, and a binary digit "0" 1010 is encoded in the coded pseudo-random signal 1004 as a rectangular pulse of amplitude −1 1012. In another implementation, the binary digit "1" may be used to encode a rectangular pulse of amplitude −1 and a binary digit "0" may be used to encode a rectangular pulse of amplitude +1.

Note that in practice the spectrum of a coded pseudo-random signal output from a time-series generator is white (i.e. random noise) with notches at frequencies that are characteristic of the coded pseudo-random sequence. For example, a notch in a coded pseudo-random signal is related to a time delay (i.e., chip length) between corresponding coded pseudo-random sequence. These delays (i.e., chip lengths) may vary depending on the value of n associated with the coded pseudo-random sequence. Chip lengths may also correspond to the time delay between rising and falling clock edges (flip flops) of the clock period of the time-series generator.

Figure 11:
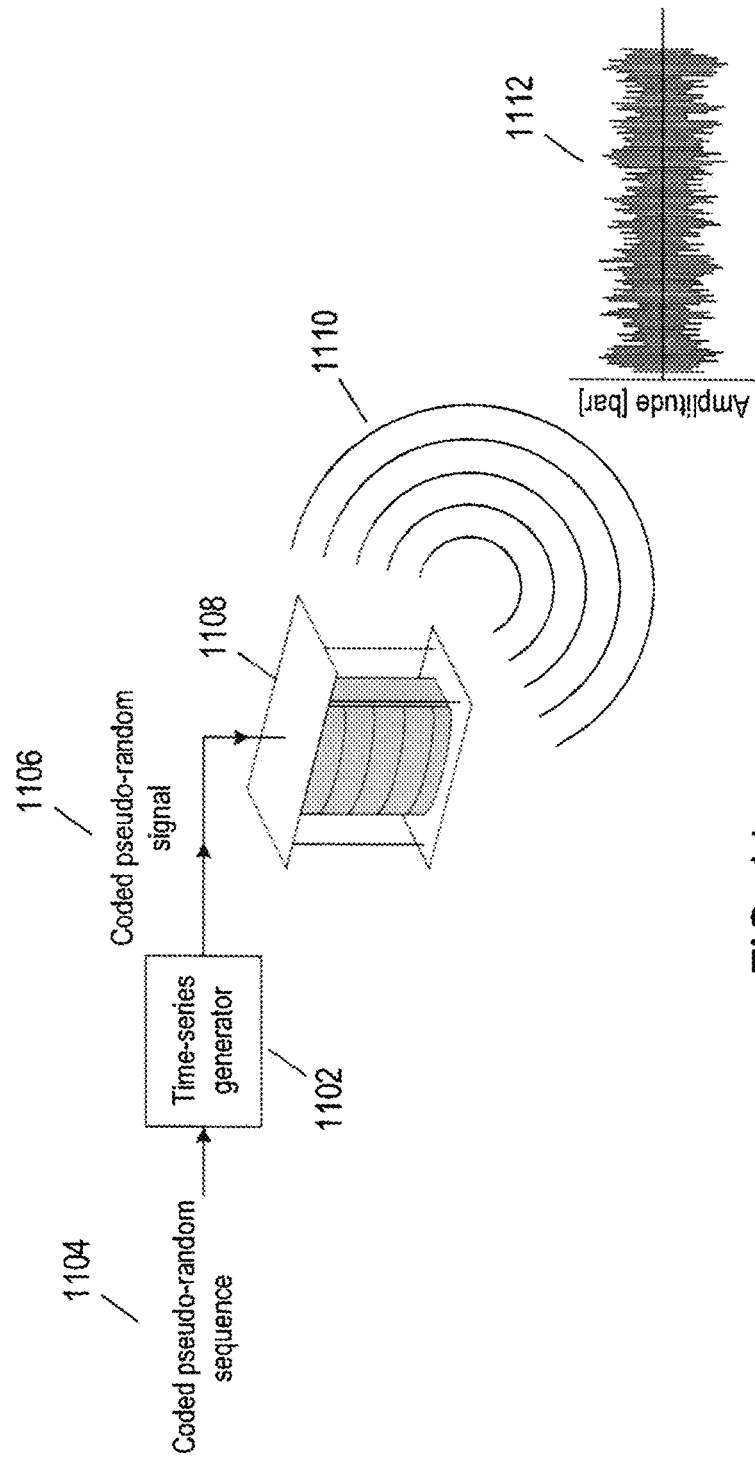
FIG. 11 shows an example time-series generator that receives a coded pseudo-random sequence and generates a coded pseudo-random signal that is input to a marine vibrator.

FIG. 11 shows an example time-series generator 1102 that receives a coded pseudo-random sequence 1104 and generates a coded pseudo-random signal 1106 that is input to a marine vibrator 1108. In response to receiving the coded pseudo-random signal 1106, the marine vibrator 1108 generates a coded pseudo-random sweep 1110 with characteristics of noise, as indicated by the signature shown in plot 1112. Plot 1112 displays the signature of the coded pseudo-random sweep 1110, revealing the characteristics of noise. The signature shown in plot 1112 is a filtered version of the coded pseudo-random sequence 1104.

Figure 12A:
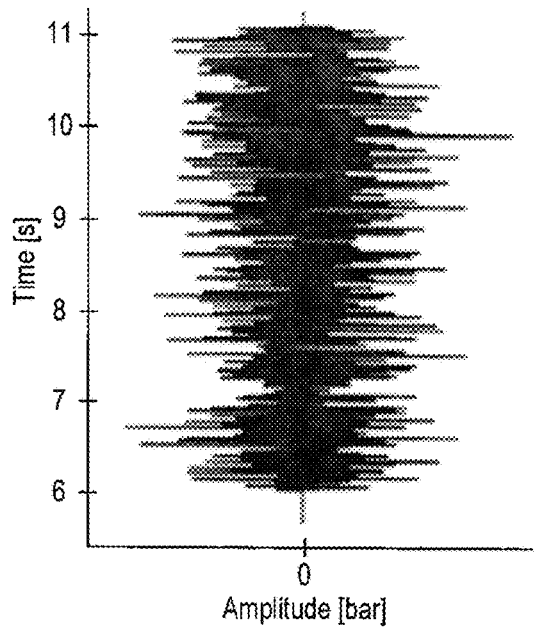
FIGS. 12A-12B show signatures of two coded pseudo-random sweeps with five second sweep durations.
Figure 12B:
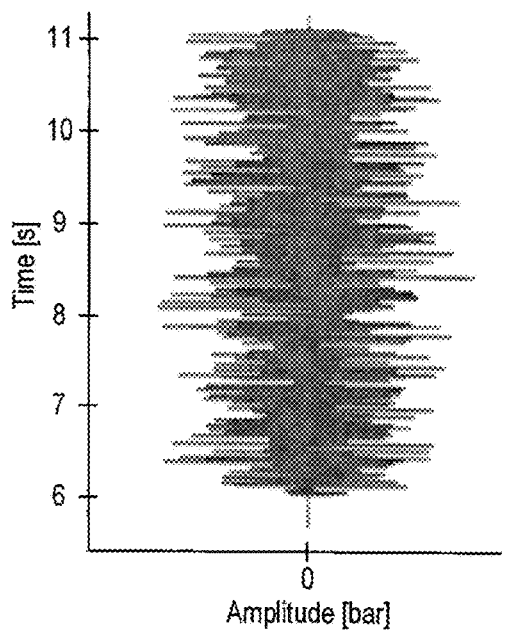

FIGS. 12A-12B show signatures of two coded pseudo-random sweeps with five second sweep durations. The coded pseudo-random sweeps were generated with two different coded pseudo-random signals. The frequency of oscillations recorded in the signatures exhibit characteristics of random noise. In other words, the frequency of oscillations of the coded pseudo-random sweeps appear random and independent of one another.

Figure 13A:
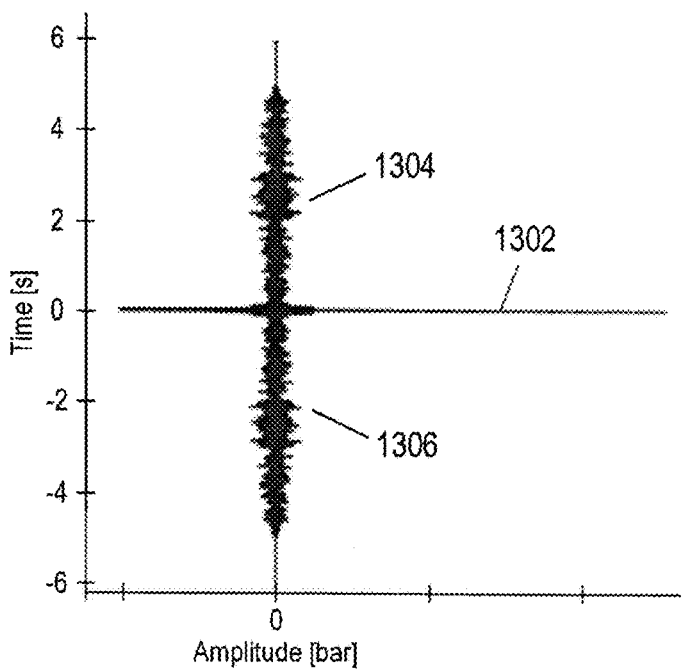
FIG. 13A shows a plot of autocorrelation of the coded pseudo-random sweep shown in FIG. 12A.
Figure 13B:
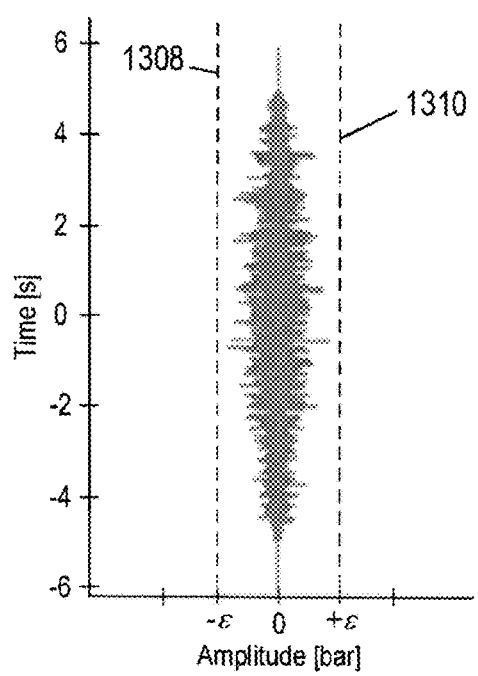
FIG. 13B shows a plot of cross-correlation of the coded pseudo-random sweeps shown in FIGS. 12A and 12B.

FIG. 13A shows a plot of autocorrelation of the signature of the coded pseudo-random sweep shown in FIG. 12A. Autocorrelation of the signature gives a sharp spike 1302 at time zero and small random variations 1304 and 1306 for non-zero lags between about −5 and 5 seconds. Autocorrelation of the signature shown in FIG. 12B (not shown) also gives a sharp spike at time zero and similar small random variations between about −5 and 5 seconds. FIG. 13B shows a plot of cross-correlation of the signatures shown in FIGS. 12A and 12B. The cross-correlation reveals random variations between about −5 and 5 seconds but does not show a spike. Unlike the cross-correlation of the signatures shown in FIGS. 8A, 8B and 9B, the cross-correlation shown in FIG. 13B lies within upper and lower bounds −ϵ and ϵ) indicated by dashed lines 1308 and 1310, respectively. In other words, the coded pseudo-random sweeps shown in FIGS. 12A and 12B satisfy the condition, $|R_{ij}(\tau)| < \epsilon$, and are orthogonal coded pseudo-random sweeps.

By using different coded pseudo-random signals to drive the marine vibrators, orthogonal coded pseudo-random sweeps are produced, which result in incoherent residual noise in gathers of seismic data. Because the residual noise is incoherent, the residual noise may be removed from traces of seismic data using any suitable noise filtering technique, such as, but not limited to, frequency-wavenumber filtering, inverse filtering, and deconvolution filtering.

FIGS. 14A-14C show common-shot gathers of seismic data (i.e., shot records) recorded following three consecutive five second coded pseudo-random sweeps. Horizontal axis 1402 represents channel numbers (i.e., trace numbers) of receivers located along a streamer. Vertical axis 1404 represents a recording period that starts when a coded pseudo-random sweep is generated. Each shot record is associated with one of the three sweeps. Comparison of the common-shot gathers in FIGS. 14A-14C with the common-shot gathers in FIGS. 7A-7C reveals the advantages of operating marine vibrators to generate coded pseudo-random sweeps instead of linear sweeps. FIG. 14A shows recorded reflection events of a reflected wavefield 1406 created by a first coded pseudo-random sweep and after cross-correlation of the recorded seismic data with the signature of the first coded pseudo-random sweep. The reflected wavefield 1406 is similar to the reflected wavefield 706 displayed in the gather of FIG. 7A. FIG. 14B shows recorded reflection events of a reflected wavefield 1408 created by a second coded pseudo-random sweep and after cross-correlation of the recorded seismic data with the signature of the second coded pseudo-random sweep. However, unlike FIG. 7B in which the reflected wavefield 710 is coherent as described above, FIG. 14B shows incoherent residual noise 1410 created by the first coded pseudo-random sweep. In other words, waveforms of the residual acoustic energy created by the first coded pseudo-random sweep is incoherent in FIG. 14B. FIG. 14C shows recorded reflection events of a reflected wavefield 1412 created by a third coded pseudo-random sweep and after cross-correlation of the recorded seismic data with the signature of the third coded pseudo-random sweep. FIG. 14C also shows incoherent residual noise 1414 created by the second coded pseudo-random sweep. Comparison of the gathers shown in FIGS. 14B and 14C with the gathers shown in FIGS. 7B and 7C reveals that the residual noise 1410 and 1414 displayed in the common-shot gathers of corresponding FIGS. 14B and 14C is incoherent and less pronounced than the residual noise 710 and 714 displayed in common-shot gathers of FIGS. 7B and 7C.

Randomization of the residual noise may be increased by sorting traces of seismic data into a common-receiver domain. A common-receiver gather is formed from traces of seismic data with the same receiver coordinate location but different source coordinate locations. However, even with randomization of linear sweeps, such as randomization of initial phase, φ, and/or random time delays between activations of the linear sweeps, coherent residual noise contaminates the resulting common-receiver gathers. By contrast, sorting traces of seismic data obtained with coded pseudo-random sweeps into the common-receiver domain further increases randomization of the residual noise. In other words, incoherence of residual noise may be further increased by sorting traces of seismic data obtained with overlapping coded pseudo-random sweeps into the common-receiver domain.

FIG. 15A shows a common-receiver gather of seismic data recorded with a linear sweep, as described above with reference to FIGS. 7A-7C. After the gather has been cross-correlated with the signature of the linear sweep. FIG. 15A displays waveforms of a reflected wavefield 1502 created by activation of the linear sweep. Even though the gather has been sorted into the common-receiver domain and cross-correlated with the signature of the corresponding linear sweep, the gather displays coherent residual noise 1504 comprising waveforms of a reflected wavefield created by a previous activation of a linear sweep.

FIG. 15B shows a common-receiver gather of seismic data recorded with linear sweeps generated with random time delays between sweeps and coded pseudo-random sweep durations. The gather displays waveforms of a reflected wavefield 1506 created by a linear sweep and cross-correlation with the signature of the linear sweep. However, because of time randomization and sorting into the common receiver domain, the gather also displays less coherent residual noise 1508 created by a previously generated linear sweep. In other words, the waveforms of a reflected wavefield created with random phase linear sweep appear as less coherent residual noise 1508.

FIG. 15C shows a common-receiver gather of seismic data recorded with coded pseudo-random sweeps as described above with reference to FIGS. 14A-14C. The gather displays waveforms of a reflected wavefield 1510 created by a coded pseudo-random sweep after cross-correlation with the signature of the coded pseudo-random sweep. Speckled area 1512 is incoherent residual acoustic energy created by a previously generated coded pseudo-random sweep. The waveforms of reflected wavefields created by the previous coded pseudo-random sweep are not discernible (i.e., incoherent). Comparison of FIG. 15C with FIGS. 13B and 13C reveals that sorting into the common-receive domain further increases the incoherency of the residual noise. For example, although the residual noise in FIGS. 14B and 14C has been substantially mitigated, remnant waveforms of the residual noise are somewhat discernible in FIGS. 14B and 14C. By contrast, none of the residual noise is coherent in FIG. 15C.

Each marine vibrator receives a different coded pseudo-random signal from a corresponding time-series generator. The marine vibrators in turn generate coded pseudo-random sweeps that are orthogonal to one another. In other words, the signatures of the coded pseudo-random sweeps satisfy the condition, $|R_{ij}(\tau)|<\epsilon$. As a result, residual noise in a gather associated with one or more previous activations of marine vibrators is incoherent as described above with reference to FIGS. 14B, 14C and 15C. The residual noise in each gather may be attenuated using any one or many different methods for filtering random noise, such as frequency-wavenumber filtering, inverse filtering, and deconvolution filtering.

Figure 16:
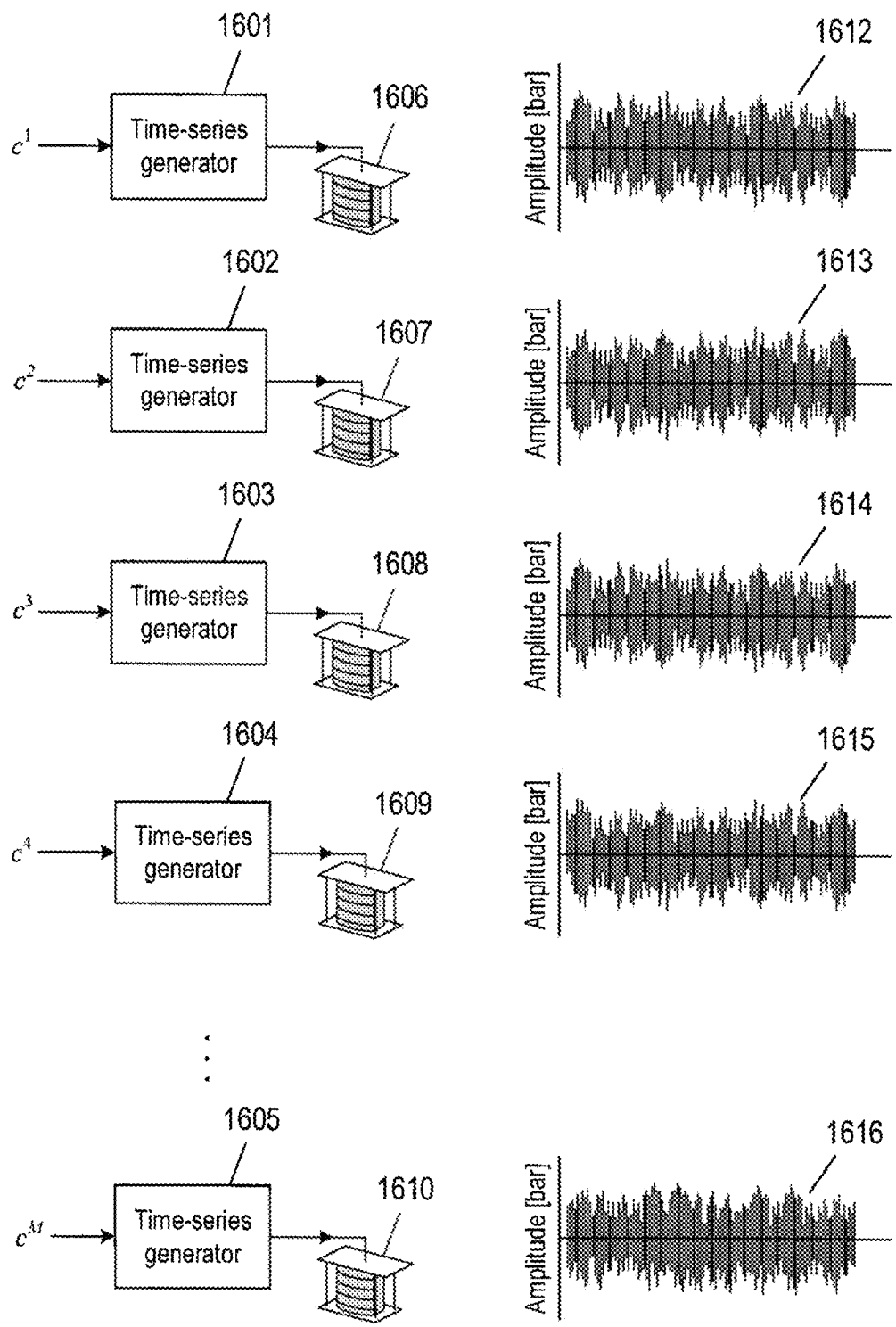
FIG. 16 shows an example of time-signal generators that output coded pseudo-random signals to corresponding marine vibrators.

FIG. 16 shows an example of time-signal generators 1601-1605 that output coded pseudo-random signals to corresponding marine vibrators 1606-1610. In this example, the time-signal generates 1601-1605 each receive a different coded pseudo-random sequence denoted by $c^1$, $c^2$, $c^3$ $c^4$, and $c^M$. The coded pseudo-random sequences may be MLSs that may have been obtained as described below with reference to FIGS. 17-20. Alternatively, the coded pseudo-random sequences may be a subset of Gold sequences $G(b^i, b^j)$ given in Equation (10). The time-series generators generate corresponding coded pseudo-random signals. The coded pseudo-random signals in turn drive the marine vibrators 1606-1610 to generate orthogonal coded pseudo-random sweeps. FIG. 16 shows example plots 1612-1616 of signatures of the orthogonal coded pseudo-random sweeps, which are orthogonal to one another according to the condition, $|R_{ij}(\tau)|<\epsilon$. Each gather of seismic data recorded for one of the coded pseudo-random sweeps 1612-1616 may be cross-correlated with the signature of the corresponding coded pseudo-random sweep to reveal reflection events created in response to the corresponding coded pseudo-random sweep and to make incoherent the residual noise created by previously generated coded pseudo-random sweeps, as described above with reference to FIGS. 14B and 14C, Each gather may also be sorted into the common-receiver domain to further increase incoherence in the residual noise as described above with reference to FIG. 15C. Residual noise associated with previous coded pseudo-random sweeps is incoherent and may be attenuated using random noise filtering.

One or more MLSs or Gold sequences may be repeatedly used to generate one or more corresponding orthogonal coded pseudo-random sweeps provided acoustic energies of corresponding previously generated orthogonal coded pseudo-random sweeps have dissipated. Suppose the coded pseudo-random sequences $c^1$, $c^2$, $c^3$, $c^4$, and $c^M$ are being used to generate corresponding orthogonal coded pseudo-random sweeps as described above with reference to FIG. 16. When the acoustic energy associated with any one of the coded pseudo-random sequences $c^1$, $c^2$, $c^3$, $c^4$, and $c^M$ has dissipated, or a suitable time period has passed in which the acoustic energy is negligible, the coded pseudo-random sequence may be used again to generate a corresponding coded pseudo-random sweep. For example, when the acoustic energy of the coded pseudo-random sweep generated with the coded pseudo-random sequence $c^1$ has dissipated (or is negligible), the coded pseudo-random sequence $c^1$ may be used again to generate the corresponding coded pseudo-random sweep.

In certain implementations, each marine vibrator may be activated separately in non-overlapping sweep intervals followed by recording seismic data in separate shot records as described above with reference to FIG. 6. Because the coded pseudo-random sweeps are orthogonal (i.e., orthogonal signatures), any residual noise created by a previously generated coded pseudo-random sweep is incoherent. In other implementations, the marine vibrators may be activated contemporaneous or with random start times while seismic data is continuously recorded.

Maximum Length Sequences

MLSs may be efficiently constructed using a linear-feedback shift register ("LFSR") and linear recursion. An LFSR includes a shift register which contains a sequence of bits and a feedback function that determines the length and type of MLS generated. The feedback function may be a primitive polynomial represented by $$p(x) = x^n + a_{n-1}x^{n-1} + \ldots + a_2x^2 + a_1x^1 + a_0 \quad (11)$$

where
n is a positive integer that corresponds to the degree of the primitive polynomial; and
coefficients $a_r \in \{0,1\}$ for $0 \le r \le n-1$.

A primitive polynomial is a polynomial where the smallest integer m for which p(x) divides $c(x) = x^m - 1$ is $m = q^n - 1$, where in this case q is a prime number. The shift register contains n (i.e., degree of primitive polynomial) memory cells, or stages, labelled $A_{n-1}$, $A_{n-2}$, ..., $A_1$, $A_0$. Each memory cell stores a 0 or 1 binary digit. An MLS is generated using an LFSR by selecting a primitive polynomial with non-zero coefficients that identify taps of binary digits stored in the memory cells in accordance with modulo-2 addition. For each iteration, the binary digit stored in the memory cell $A_0$ becomes the element b (i.e., b=0 or 1) in a binary sequence and the binary digit stored in each of the other memory cells are transferred to a next memory cell and is operated on according to the primitive polynomial and architecture of the LFSR. The memory cells are initially loaded with a seed sequence of n binary digits (e.g. (0, ..., 0, 1) or (1, ..., 1, 0)). The seed sequence cannot be composed of all zero values. The length (i.e., number of elements) of the resulting binary sequence is $N = 2^n - 1$, which depends on the length the LFSR used for generating the sequence b.

FIG. 17 shows a table of examples of primitive polynomials. Column 1702 list the degree (n) of the primitive polynomials listed in column 1704. For example, the coefficients of a primitive polynomial of degree 5 (i.e., $p(x) = x^5 + x^2 + 1$) are $a_0 = a_2 = a_5 = 1$ and $a_1 = a_3 = a_4 = 0$.

Figure 18A:
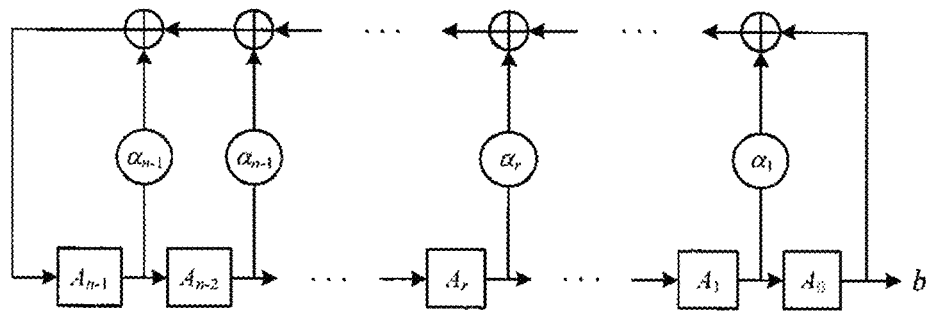
FIGS. 18A-18B show example architectures of two types of linear-feedback shift registers ("LFSR").

FIG. 18A shows an example LFSR architecture. The LFSR includes a shift register with memory cells labeled $A_{n-1}$, $A_{n-2}$, ..., $A_1$, and $A_0$ that store binary digits for each iteration. The coefficients of a selected primitive polynomial correspond to taps on the output of each memory cell that lead to corresponding exclusive OR operators. The values of the coefficients determine which taps and corresponding exclusive OR operators remain in the LFSR. If a coefficient is 1 then the tap and corresponding exclusive OR operator remains in the LFSR. If a coefficient is 0 then the tap and corresponding exclusive OR operator is omitted from the LFSR. Each exclusive OR operator performs modulo-2 addition on two binary digits. Directional arrows between memory cells represent how output of the memory cells shift with each iteration. For each iteration, the binary digit stored in memory cell $A_0$ is added to the sequence b.

Figure 18B:
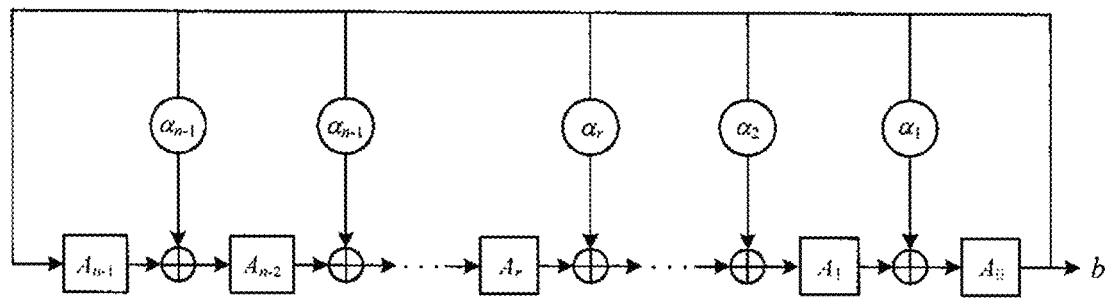

FIG. 18B shows an example LFSR architecture. The LFSR includes the same shift register as the LFSR shown in FIG. 18A. Exclusive OR operators are located between the memory cells $A_{n-1}$, $A_{n-2}$, ..., $A_1$. The coefficients of a selected primitive polynomial determine which exclusive OR operators remain in the LFSR. If a coefficient is 1 then the exclusive OR operator remains in the LFSR. If a coefficient is 0 then the exclusive OR operator is omitted from the LFSR. For each iteration, the exclusive OR operators add the binary digit output from the memory cell $A_0$ to the output of the memory cells with corresponding non-zero coefficients according to modulo-2 addition. For each iteration, the binary digit stored in memory cell $A_0$ is added to the sequence b and is input to the memory cell $A_{n-1}$.

Figure 19:
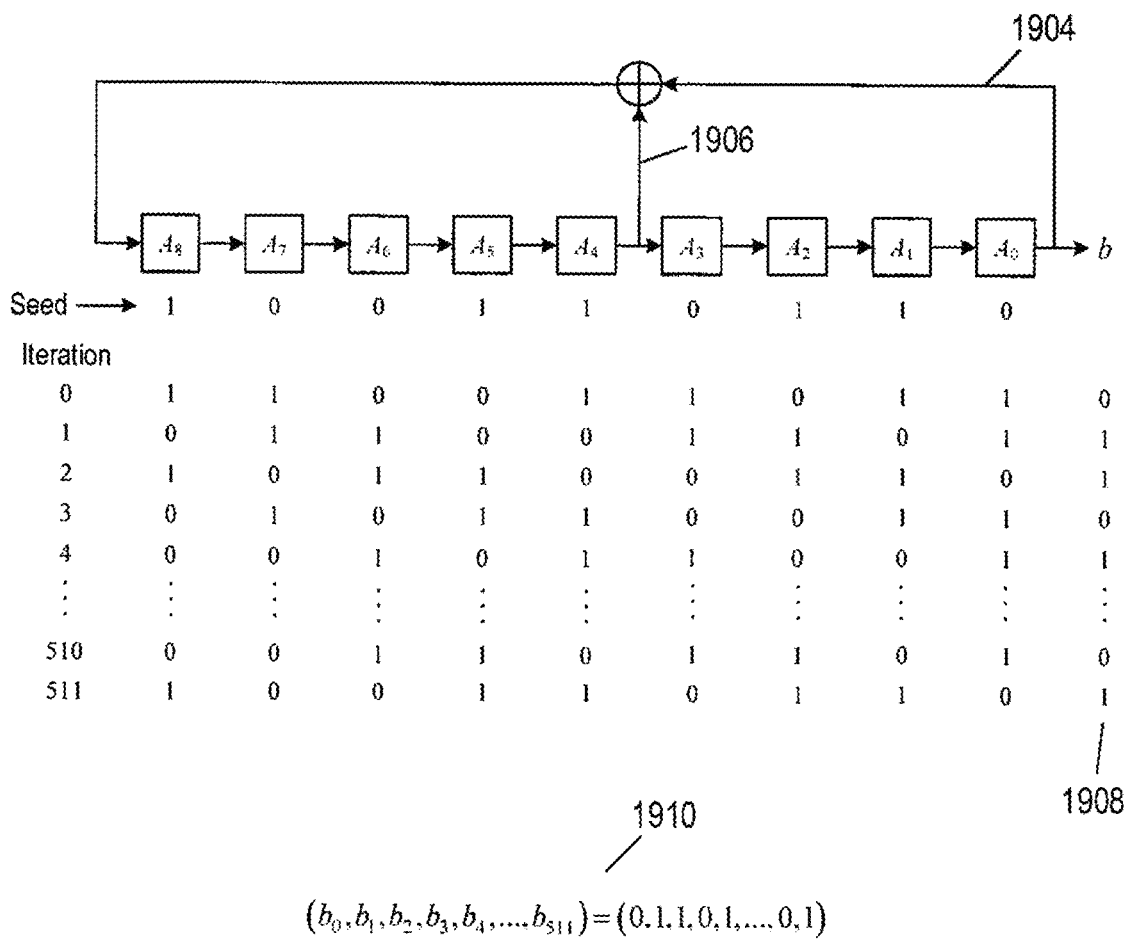
FIG. 19 shows an example implementation of the LFSR architecture shown in FIG. 18B.

FIG. 19 shows an example implementation of the LFSR architecture shown in FIG. 18B. In this example, the feedback function is a primitive polynomial 1902 of degree 9 with coefficients $a_0 = a_4 = a_9 = 1$ and the other coefficients are equal to zero. As a result, the LFSR architecture comprises nine (i.e., n =9) memory cells labeled $A_8$, $A_7$, ..., $A_1$, $A_0$ with taps on the outputs of memory cells $A_0$ and $A_4$ as represented by directional arrows 1904 and 1906, respectively. The memory cells are initially loaded with a seed sequence of binary digits (1,0,0,1,1,0,1,1,0). For this example, the resulting binary sequence has a length (i.e., period) of 511 binary digits. A number of the elements of the resulting binary sequence are listed in column 1908. Note that the 511-th sequence of binary digits stored in the memory cells are the seed binary digits. In other words, a subsequent 512 iterations will reproduce the same binary sequence. The elements of the resulting binary sequence 1910 correspond to the binary digits listed in column 1908.

Figure 20:
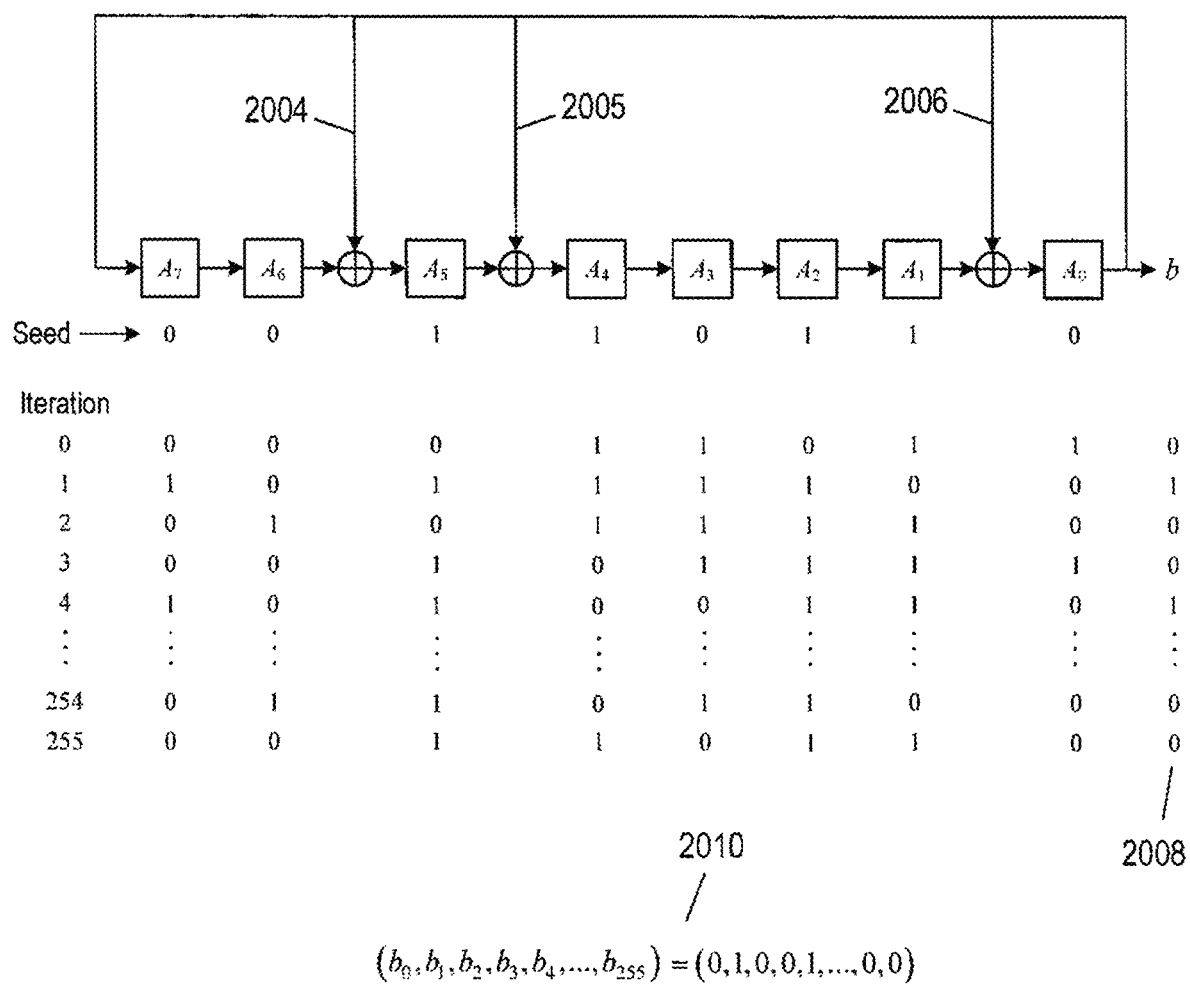
FIG. 20 shows an example implementation of the LFSR architecture shown in FIG. 18C.

FIG. 20 shows an example implementation of the LFSR architecture shown in FIG. 18C. In this example, the feedback function is a primitive polynomial 2002 of degree 8 with coefficients $a_0 = a_1 = a_5 = a_6 = a_8 = 1$ and the other coefficients are equal to zero. As a result, the LFSR architecture comprises nine (i.e., n=8) memory cells labeled $A_7, \ldots, A_1$, $A_0$. Directional arrows 2004-2006 correspond to non-zero coefficients $a_1=a_5=a_6=1$. The memory cells are initially loaded with a seed sequence of binary digits (0,0,1,1,0,1,1, 0). For this example, the resulting binary sequence has a length, or period, of 255 binary digits. A number of elements of the resulting binary sequence are listed in column 2008. Note that the 255-th sequence of binary digits stored in the memory cells are the seed binary digits. In other words, a subsequent 256 iterations will reproduce the same binary sequence. The elements of the resulting binary sequence 2010 correspond to the binary digits listed in column 2008.

In certain implementations, one or more seed sequences used to generate one or more MLSs may be repeatedly used provided acoustic energies associated with corresponding previously generated coded pseudo-random sweeps have dissipated. For example, when the acoustic energy of a coded pseudo-random sweep generated with an MLS has dissipated (or is negligible), the seed sequence used to generate the MLS may again be used to generate the MLS that is in turn used to generate the corresponding coded pseudo-random sweep.

Figure 21:
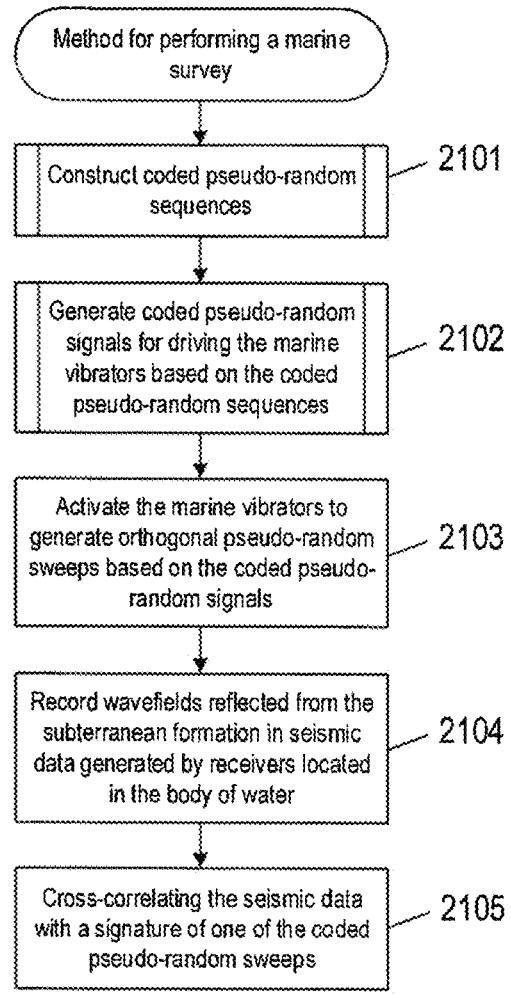
FIG. 21 is a flow diagram illustrating an example implementation of a method for performing a marine survey.

FIG. 21 is a flow diagram illustrating an example implementation of a method for performing a marine survey. In block 2101, a "construct coded pseudo-random sequences" procedure is performed. Example implementations of the "construct coded pseudo-random sequences" procedure are described below with reference to FIGS. 22 and 23. In block 2102, a "generate coded pseudo-random signals for driving the marine vibrators based on the coded pseudo-random sequences" procedure is performed. An example implementation of the "generate coded pseudo-random signals for driving the marine vibrators based on the coded pseudo-random sequences" procedure is described below with reference to FIG. 25. In block 2103, the marine vibrators are activated to generate orthogonal coded pseudo-random sweeps using the coded pseudo-random signals. In block 2104, reflected from the subterranean formation are recorded in seismic data by receivers located in the body of water. In block 2105, the seismic data is sorted into the common-receiver domain to obtain seismic data with incoherent residual noise.

Figure 22:
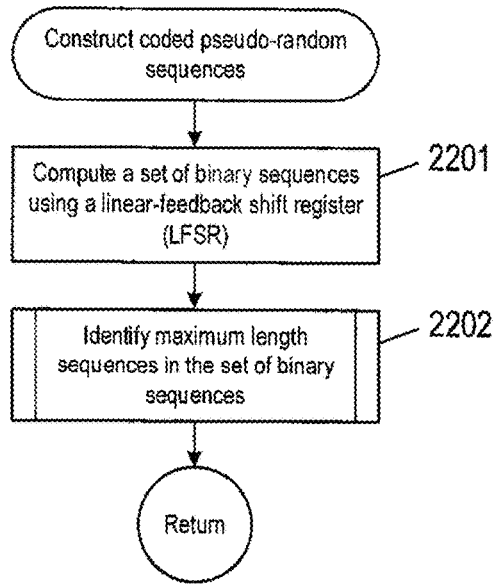
FIG. 22 is a flow diagram illustrating an example implementation of the "construct coded pseudo-random sequences" procedure in FIG. 21.

FIG. 22 is a flow diagram illustrating an example implementation of the "construct coded pseudo-random sequences" procedure in block 2102 of FIG. 21. In block 2201, a set of binary sequences are computed using a linear-feedback shift register as described above with reference to FIGS. 18A-20. In block 2202, an "identify maximum length sequences in the set of binary sequence" procedure is performed. An example implementation of the "identify maximum length sequences in the set of binary sequence" procedure is described below with reference to FIG. 24.

Figure 23:
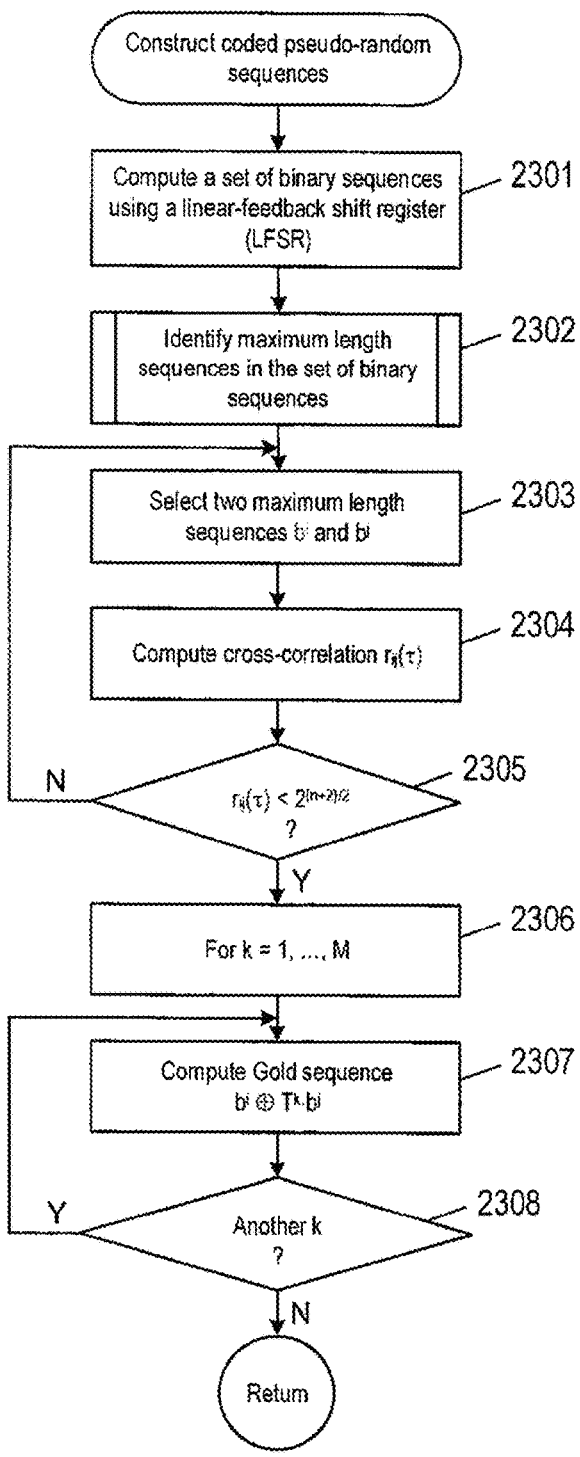
FIG. 23 is a flow diagram illustrating an example implementation of the "construct coded pseudo-random sequences" procedure in FIG. 21.

FIG. 23 is a flow diagram illustrating an example implementation of the "construct coded pseudo-random sequences" procedure in block 2102 of FIG. 21. In block 2301, a set of binary sequences are computed using a linear-feedback shift register as described above with reference to FIGS. 18A-20. In block 2302, a "identify maximum length sequences in the set of binary sequence" procedure is performed. An example implementation of the "identify maximum length sequences in the set of binary sequence" procedure is described below with reference to FIG. 24. In block 2303, two maximum length sequences $b^i$ and $b^j$ are selected from the maximum length sequences obtained in block 2302. In block 2304, the cross-correlation between the selected binary sequences is computed as described with reference to Equation (7). In decision block 2305, when the cross-correlation obtained in block 2304 satisfies the condition in Equation (7) control flows to block 2306. A loop beginning with block 2306 repeats the computational operation represented by block 2307. In block 2307, a Gold sequence is computed as described above with reference to Equation (8). In decision block 2308, the operation represented by block 2205 is repeated for until k equals M.

Figure 24:
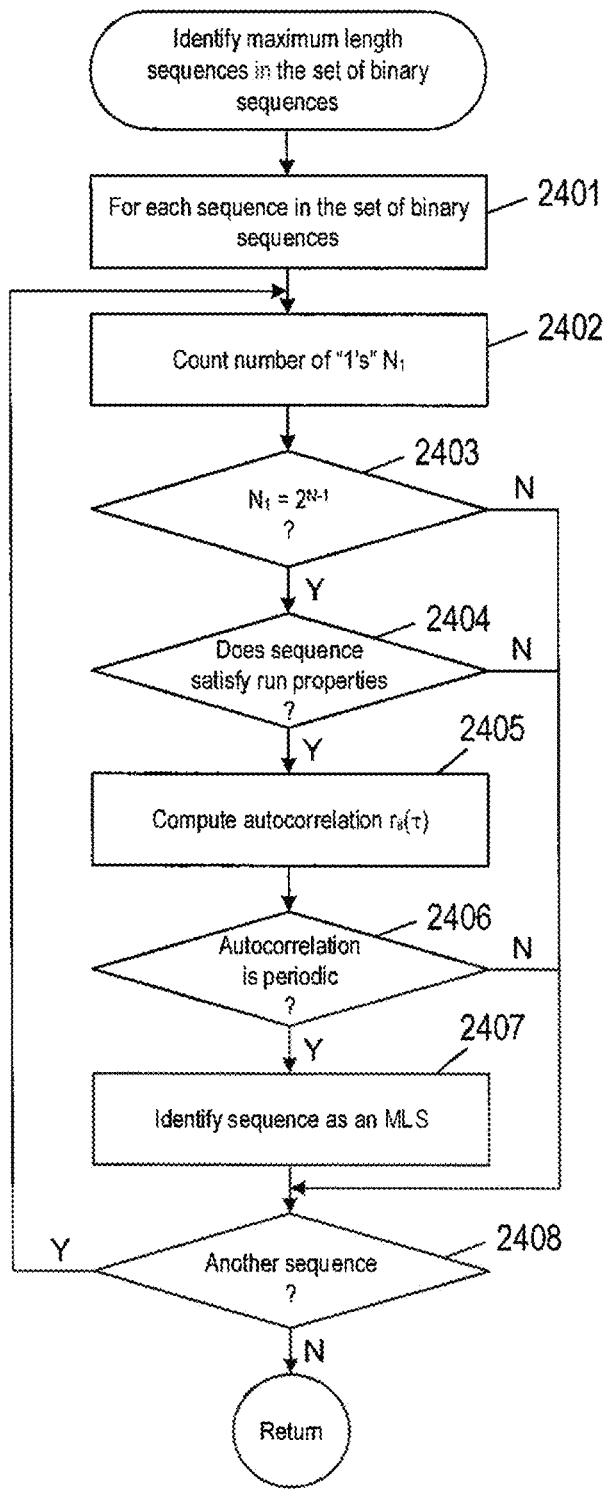
FIG. 24 is a flow diagram illustrating an example implementation of the "identify maximum length sequences in the set of binary sequence" procedure in FIG. 22 and in FIG. 23.

FIG. 24 is a flow diagram illustrating an example implementation of the "identify maximum length sequences in the set of binary sequence" procedure in block 2202 of FIG. 22 and block 2303 of FIG. 23. A loop beginning with block 2401 repeats the computational operations of represented by blocks 2402-2407. In block 2402, the number of ones denoted by $N_1$ in the binary sequence are counted. Alternatively, the number of zeros denote by $N_0$ in the binary sequence may be counted. In decision block 2403, when $N_1=2^{n-1}$ or $N_0=2^{n-1}$, control flows to decision block 2404. In decision block 2404, when one half of runs are of length 1; one quarter of the runs are of length 2; one eighth of the runs are length 3, and one sixteenth of the runs are of length 4, control flows to block 2405. In block 2405, autocorrelation of the binary sequence is computed. In decision block 2406, if the autocorrelation is periodic as represented in Equation (6), control flows to block 2407. In block 2407, the binary sequence is identified as an MLS. In decision block 2408, control flows to block 2309 for another binary sequences.

Figure 25:
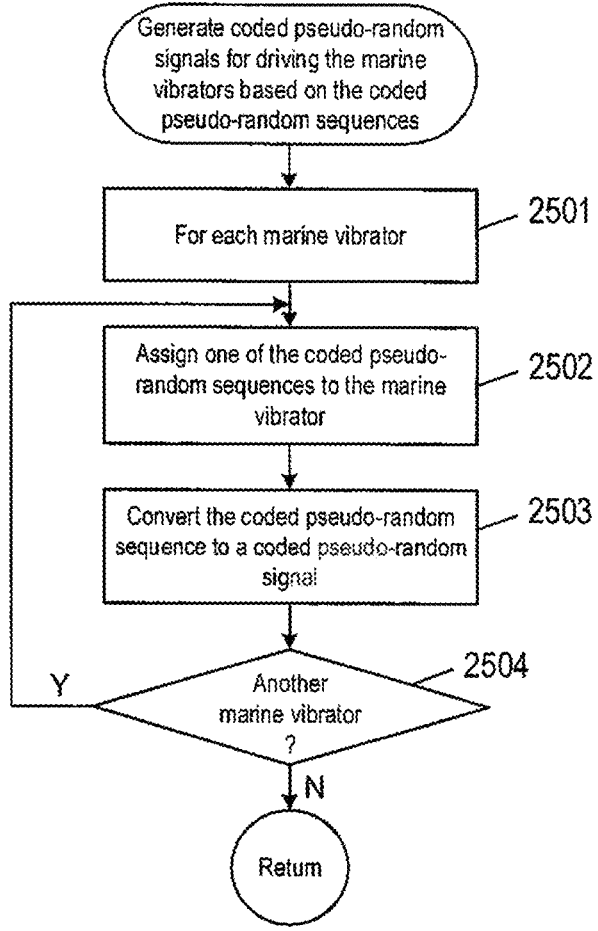
FIG. 25 is a flow diagram illustrating an example implementation of the "generate coded pseudo-random signals for driving the marine vibrators based on the coded pseudo-random sequences" procedure in FIG. 21.

FIG. 25 is a flow diagram illustrating an example implementation of the "generate coded pseudo-random signals for driving the marine vibrators based on the coded pseudo-random sequences" procedure in block 2102 of FIG. 21. A loop beginning with block 2501 performs the operations represented by blocks 2502-2503 for each marine vibrator. In block 2502, assign one of the coded pseudo-random sequences obtained in FIG. 21 to the marine vibrator. In block 2503, convert the coded pseudo-random sequence assigned to the marine to a coded pseudo-random signal using a time-series generator. In decision block 2504, the operations represented by blocks 2502 and 2504 are repeated for another marine vibrator.

Figure 26:
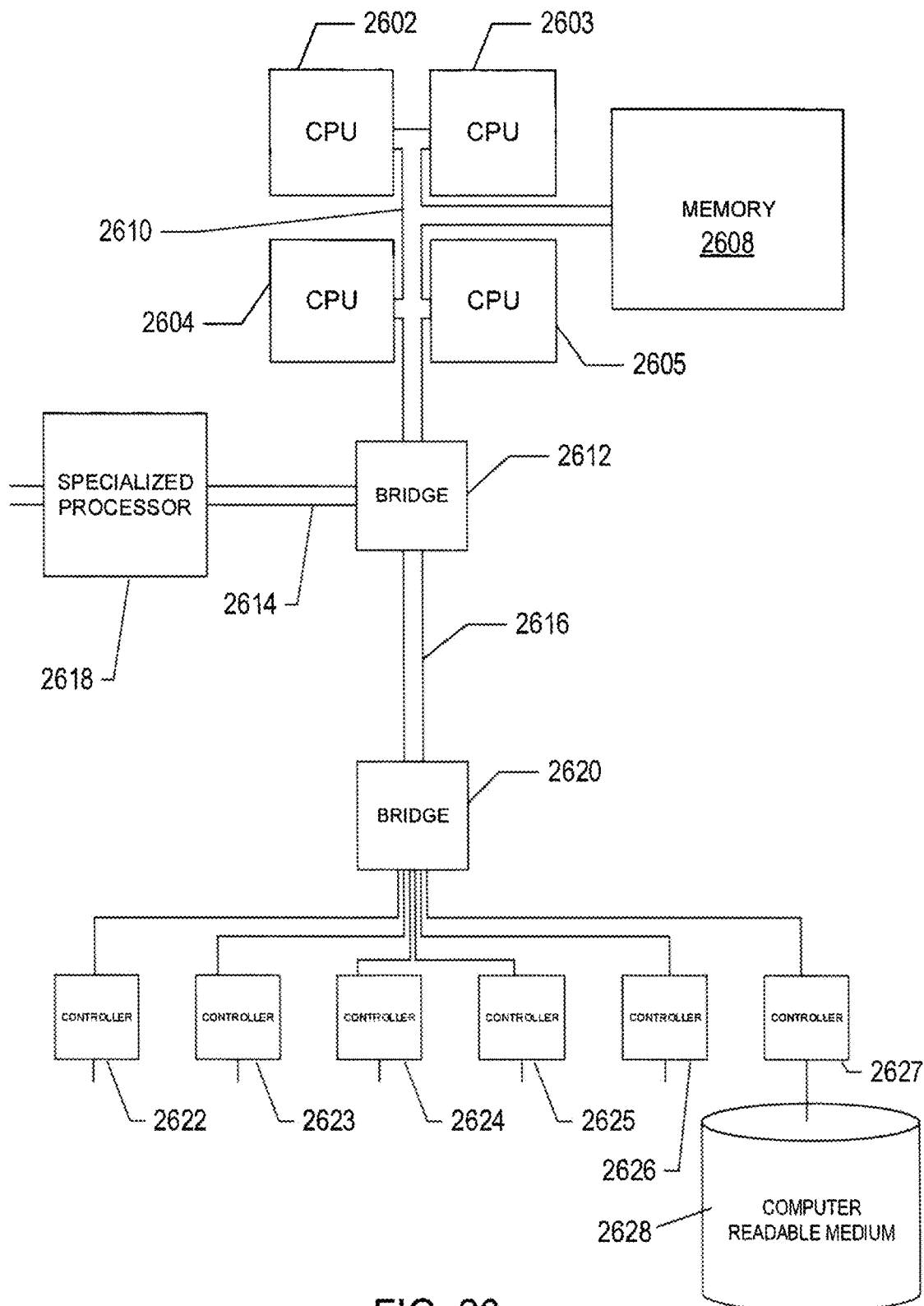
FIG. 26 shows an example computer system that may be used to execute efficient processes described herein and therefore represents a geophysical-analysis data-processing system.

FIG. 26 shows an example computer system that may be used to execute an efficient process for generating coded pseudo-random sequences and other computation operations described herein, and therefore represents a geophysical-analysis data-processing system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 2602-2605, one or more electronic memories 2608 interconnected with the CPUs by a CPU/memory-subsystem bus 2610 or multiple busses, a first bridge 2612 that interconnects the CPU/memory-subsystem bus 2610 with additional busses 2614 and 2616, or other types of high-speed interconnection media, including multiple, high-speed serial interconnects. The busses or serial interconnections, in turn, connect the CPUs and memory with specialized processors, such as a graphics processor 2618, and with one or more additional bridges 2620, which are interconnected with high-speed serial links or with multiple controllers 2622-2627, such as controller 2627, that provide access to various different types of computer-readable media, such as computer-readable medium 2628, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2628 is a data-storage device, which may include, for example, electronic memory, optical or magnetic disk drive, a magnetic tape drive, USB drive, flash memory and any other such data-storage device or devices. The computer-readable medium 2628 can be used to store machine-readable instructions that encode the computational methods described above. The computer-readable medium 2628 or similar devices can also be used to store geophysical data that results from application of the above methods to recorded seismic signals.

The processes and systems disclosed herein may be used to manufacture a geophysical data product indicative of certain properties of a subterranean formation. A geophysical data product may be manufactured by using the processes and systems described herein to generate geophysical data and store the geophysical data in a computer-readable medium 1628. The geophysical data may be pressure data, vertical velocity data, upgoing and downgoing wavefields, deblended wavefield with attenuated source ghost and source signatures, and any image of a subterranean formation computed using the processes and systems described herein and displayed on or using a display screen or device. The geophysical data product may be produced offshore (i.e., by equipment on the survey vessel 102) or onshore (i.e., at a computing facility on land), or both.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. A method for performing a marine survey with marine vibrators located in a body of water above a subterranean formation, the method comprising:
    generating coded pseudo-random signals for driving the marine vibrators based on coded pseudo-random sequences;
    using the coded pseudo-random signals to activate the marine vibrators to generate orthogonal coded pseudo-random sweeps that penetrate the subterranean formation;
    recording wavefields reflected from the subterranean formation in seismic data generated by receivers located in the body of water; and
    cross-correlating the seismic data with a signature of one of the coded pseudo-random sweeps to attenuate incoherent residual noise in the seismic data, wherein generating the coded pseudo-random signals for driving the marine vibrators comprises repeatedly using seed binary sequences to generate the coded pseudo-random sequences.

2. The method of claim 1 wherein generating the coded pseudo-random signals for driving the marine vibrators comprises:
    generating binary sequences using a linear-feedback shift register in which each binary sequence is generated with seed sequences; and
    identifying maximum length sequences of the binary sequences with a balanced number of ones and zeros and periodic autocorrelation, wherein the maximum length sequences are the coded pseudo-random sequences.

3. The method of claim 1 wherein generating coded pseudo-random signals for driving the marine vibrators comprises:
    generating binary sequences using a linear-feedback shift register in which each binary sequence is generated with seed sequences;
    identifying maximum length sequences of the binary sequences with a balanced number of ones and zeros and periodic autocorrelation;
    identifying two maximum length sequences with a bounded cross-correlation determined by a number of memory cells in the linear-feedback shift register; and
    using a circular shift operator to generate Gold sequences based on the two maximum length sequences, wherein the two maximum length sequences and the Gold sequences are the coded pseudo-random sequences.

4. The method of claim 1 wherein generating coded pseudo-random signals for driving the marine vibrators based on coded pseudo-random sequences comprises converting each maximum length sequence into one of the coded pseudo-random signals using a time-series generator.

5. The method of claim 1 wherein signatures of the coded pseudo-random signals are orthogonal.

6. The method of claim 1 further comprising sorting the seismic data into a common-receiver domain to obtain seismic data to further attenuate incoherent residual noise in the seismic data.

7. The method of claim 1 further comprising applying noise filtering to the seismic data to remove the incoherent residual noise.

8. The method of claim 1 wherein generating the coded pseudo-random signals for driving the marine vibrators comprises repeatedly using the coded pseudo-random sequences to generate the coded pseudo-random signals.

9. A method for performing a marine survey, the method comprising:
    towing marine vibrators in a body of water above a subterranean formation;
    activating the marine vibrators to generate orthogonal coded pseudo-random sweeps in the body of water above the subterranean formation, the orthogonal coded pseudo-random sweeps having orthogonal signatures;
    detecting wavefields emitted from a subterranean formation in response to the coded pseudo-random sweeps at receivers located in a body of water; and
    recording seismic data generated by the receivers in separate shot records, each shot record containing a record of a wavefield reflected from the subterranean formation following activation of one of the marine vibrators and at least a portion of the shot records containing incoherent residual noise associated with one or more previous activations of one or more of the marine vibrators, wherein activating the marine vibrators to generate orthogonal coded pseudo-random sweeps comprises:
    generating binary sequences using a linear-feedback shift register in which each binary sequence is generated with seed sequences;

identifying maximum length sequences of the binary sequences with a balanced number of ones and zeros and periodic autocorrelation; and converting the maximum length sequences into coded pseudo-random signals used to activate the marine vibrators to generate the orthogonal coded pseudo-random sweeps.

10. The method or claim 9 wherein activating the marine vibrators to generate orthogonal coded pseudo-random sweeps comprises generating coded pseudo-random signals for driving the marine vibrators based on coded pseudo-random sequences.

11. The method of claim 9 wherein activating the marine vibrators to generate coded pseudo-random sweeps comprises:

generating binary sequences using a linear-feedback shift register in which each binary sequence is generated with seed sequences;

identifying maximum length sequences of the binary sequences with a balanced number of ones and zeros and periodic autocorrelation;

identifying two maximum length sequences with a bounded cross-correlation determined by a number of memory cells in the linear-feedback shift register;

using a circular shift operator to generate Gold sequences based on the two maximum length sequences; and converting the Gold sequences into coded pseudo-random signals used to activate the marine vibrators to generate the orthogonal coded pseudo-random sweeps.

12. The method of claim 9 further comprising applying noise filtering to the seismic data to remove the incoherent residual noise.

13. The method of claim 9 further comprising cross-correlating the recorded seismic data with a signature of one or the coded pseudo-random sweeps to attenuate the incoherent residual noise.

14. The method of claim 9 further comprises sorting the seismic data into the col-onion-receiver domain.

15. The method of claim 9 wherein activating the marine vibrators to generate orthogonal coded pseudo-random sweeps comprises repeatedly using coded pseudo-random sequences to generate coded pseudo-random signals that are input to the marine vibrators.

16. The method of claim 9 wherein activating the marine vibrators to generate orthogonal coded pseudo-random sweeps comprises repeatedly using seed sequences to generate coded pseudo-random sequences to generate coded pseudo-random signals that are input to the marine vibrators.

17. A method for manufacturing a geophysical data product, the method comprising:

generating coded pseudo-random signals for driving the marine vibrators based on coded pseudo-random sequences;

using the coded pseudo-random signals to activate the marine vibrators to generate orthogonal coded pseudo-random sweeps that penetrate a subterranean formation located below the body of water;

recording wavefields reflected from the subterranean formation in seismic data generated by receives located in the body of water;

sorting the seismic data into the common-receiver domain to obtain seismic data with incoherent residual noise; and storing the seismic data in a non-transitory computer readable medium, wherein generating the coded pseudo-random signals for driving the marine vibrators comprises repeatedly using seed binary sequences to generate the coded pseudo-random sequences.

\* \* \* \* \*

UNITED STATES PATENT AND TRADEMARK OFFICE
CERTIFICATE OF CORRECTION

| | | |
|---|---|---|
| PATENT NO. | : 11,914,090 B2 | Page 1 of 1 |
| APPLICATION NO. | : 16/997339 | |
| DATED | : February 27, 2024 | |
| INVENTOR(S) | : Orji et al. | |

It is certified that error appears in the above-identified patent and that said Letters Patent is hereby corrected as shown below:

In the Specification

In Column 4, Line 13 delete "FGI. 1A" and insert -- FIG. 1A --.

In Column 4, Line 25 delete "(i.e." and insert -- (i.e., --.

In Column 7, Line 19 delete "$\vec{x}_s(\vec{x}_s, a_{\vec{n}}, t)$" and insert -- $v_{\vec{n}}(\vec{x}_r, \vec{x}_s, t)$ --.

In Column 7, Lines 21-22 delete "$\vec{x}_s(\vec{x}_s, a_{\vec{n}}, t)$" and insert -- $a_{\vec{n}}(\vec{x}_r, \vec{x}_s, t)$ --.

In Column 12, Line 35 delete "FIG. 713," and insert -- FIG. 7B --.

In Column 16, Line 19 delete "(i.e." and insert -- (i.e., --.

In Column 17, Line 65 delete "sweep." and insert -- sweep, --.

In Column 21, Line 38 delete "reflected" and insert -- wavefields --.

In Column 22, Line 17 delete "$N_0 = 2^{n-1}$" and insert -- $N_0 = 2^{n-1} - 1$ --.

In the Claims

In Column 25, Line 8, in Claim 10 delete "or" and insert -- of --.

In Column 26, Line 2, in Claim 14 delete "col-onion-receiver" and insert -- common-receiver --.

Signed and Sealed this
Twenty-fifth Day of February, 2025

Coke Morgan Stewart
*Acting Director of the United States Patent and Trademark Office*